United States Patent
Maamari et al.

(10) Patent No.: US 12,356,235 B2
(45) Date of Patent: Jul. 8, 2025

(54) RESOLVING SR AND BSR DELAY FROM MEASUREMENT GAP CONFLICT FOR LOW LATENCY

(71) Applicant: QUALCOMM Incorporated, San Diego, CA (US)

(72) Inventors: Diana Maamari, San Diego, CA (US); Ahmed Elshafie, San Diego, CA (US); Hyun Yong Lee, San Diego, CA (US); Linhai He, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 433 days.

(21) Appl. No.: 18/052,548

(22) Filed: Nov. 3, 2022

(65) Prior Publication Data

US 2024/0155386 A1 May 9, 2024

(51) Int. Cl.
*H04W 24/10* (2009.01)
*H04W 24/08* (2009.01)
*H04W 28/02* (2009.01)
*H04W 72/12* (2023.01)
*H04W 72/231* (2023.01)
*H04W 72/232* (2023.01)
(Continued)

(52) U.S. Cl.
CPC ....... *H04W 28/0205* (2013.01); *H04W 24/08* (2013.01); *H04W 24/10* (2013.01); *H04W 28/0236* (2013.01); *H04W 28/0268* (2013.01); *H04W 28/0273* (2013.01); *H04W 28/0278* (2013.01); *H04W 28/0289* (2013.01); *H04W 72/1221* (2013.01); *H04W 72/231* (2023.01); *H04W 72/232* (2023.01); *H04W 72/56* (2023.01); *H04W 80/02* (2013.01); *H04W 80/08* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ....... H04L 43/02–55; H04L 47/10–83; H04W 8/22–245; H04W 24/02–10; H04W 28/02–26; H04W 48/02–20; H04W 56/0005–0095; H04W 72/02–569; H04W 76/10–50; H04W 80/02–12; H04W 84/02–16; H04W 88/02–12; H04W 92/02–04; H04W 92/10
See application file for complete search history.

(56) References Cited

U.S. PATENT DOCUMENTS

2014/0301188 A1* 10/2014 Koskinen .......... H04W 28/0205
2024/0244483 A1* 7/2024 Chen ..................... H04W 28/06

* cited by examiner

*Primary Examiner* — Timothy J Weidner
(74) *Attorney, Agent, or Firm* — Procopio, Cory, Hargreaves & Savitch LLP

(57) ABSTRACT

Apparatuses and methods for resolving SR, BSR, and/or PUSCH data delay from MG conflict for low latency. An apparatus is configured to obtain a configuration of a delay threshold associated with an UL PDCP queuing delay for a transmission buffer. The apparatus is configured to measure a packet buffer time in which at least one UL data packet is in the transmission buffer, where the at least one UL data packet is associated with a SR, a BSR, or PUSCH data. In addition, the apparatus is configured to transmit, for a network node, at least one of the SR, the BSR, or the PUSCH data during a portion of a MG in a MG interval or outside of the MG based on the packet buffer time being less than or greater than or equal to the delay threshold.

30 Claims, 13 Drawing Sheets

(51) Int. Cl.
*H04W 72/56* (2023.01)
*H04W 80/02* (2009.01)
*H04W 80/08* (2009.01)
*H04W 84/02* (2009.01)
*H04W 88/02* (2009.01)
*H04W 88/08* (2009.01)
*H04W 92/02* (2009.01)
*H04W 92/10* (2009.01)

RESOLVING SR AND BSR DELAY FROM MEASUREMENT GAP CONFLICT FOR LOW LATENCY

TECHNICAL FIELD

The present disclosure relates generally to communication systems, and more particularly, to wireless communications utilizing scheduling requests (SRs), buffer status reports (BSRs), and physical uplink shared channel (PUSCH) data.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus is configured to obtain a configuration of a delay threshold associated with an uplink (UL) packet data convergence protocol (PDCP) queuing delay for a transmission buffer. The apparatus is configured to measure a packet buffer time in which at least one UL data packet is in the transmission buffer, where the at least one UL data packet is associated with a scheduling request (SR), a buffer status report (BSR), or physical uplink shared channel (PUSCH) data. In addition, the apparatus is configured to transmit, for a network node, at least one of the SR, the BSR, or the PUSCH data during a portion of a measurement gap (MG) in a MG interval or outside of the MG based on the packet buffer time being less than or greater than or equal to the delay threshold.

In the aspect, the method includes obtaining a configuration of a delay threshold associated with an uplink (UL) packet data convergence protocol (PDCP) queuing delay for a transmission buffer. The method also includes measuring a packet buffer time in which at least one UL data packet is in the transmission buffer, where the at least one UL data packet is associated with a scheduling request (SR), a buffer status report (BSR), or physical uplink shared channel (PUSCH) data. The method further includes transmitting, for a network node, at least one of the SR, the BSR, or the PUSCH data during a portion of a measurement gap (MG) in a MG interval or outside of the MG based on the packet buffer time being less than or greater than or equal to the delay threshold.

In another aspect of the disclosure, a method, a computer-readable medium, and an apparatus are provided for wireless communication at a network node. The apparatus is configured to configure a delay threshold associated with an uplink (UL) packet data convergence protocol (PDCP) queuing delay for a transmission buffer of a user equipment (UE). The apparatus is also configured to transmit a configuration of the delay threshold associated with the UL PDCP queuing delay in the transmission buffer. The apparatus is further configured to receive, from the UE, at least one of a scheduling request (SR), a buffer status report (BSR), or physical uplink shared channel (PUSCH) data during a portion of a measurement gap (MG) in a MG interval or outside of the MG based on a packet buffer time being less than or greater than or equal to the delay threshold, where the packet buffer time is a time in which at least one UL data packet is in the transmission buffer.

In the aspect, the method includes configuring a delay threshold associated with an uplink (UL) packet data convergence protocol (PDCP) queuing delay for a transmission buffer of a user equipment (UE). The method also includes transmitting a configuration of the delay threshold associated with the UL PDCP queuing delay in the transmission buffer. The method further includes receiving, from the UE, at least one of a scheduling request (SR), a buffer status report (BSR), or physical uplink shared channel (PUSCH) data during a portion of a measurement gap (MG) in a MG interval or outside of the MG based on a packet buffer time being less than or greater than or equal to the delay threshold, where the packet buffer time is a time in which at least one UL data packet is in the transmission buffer.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
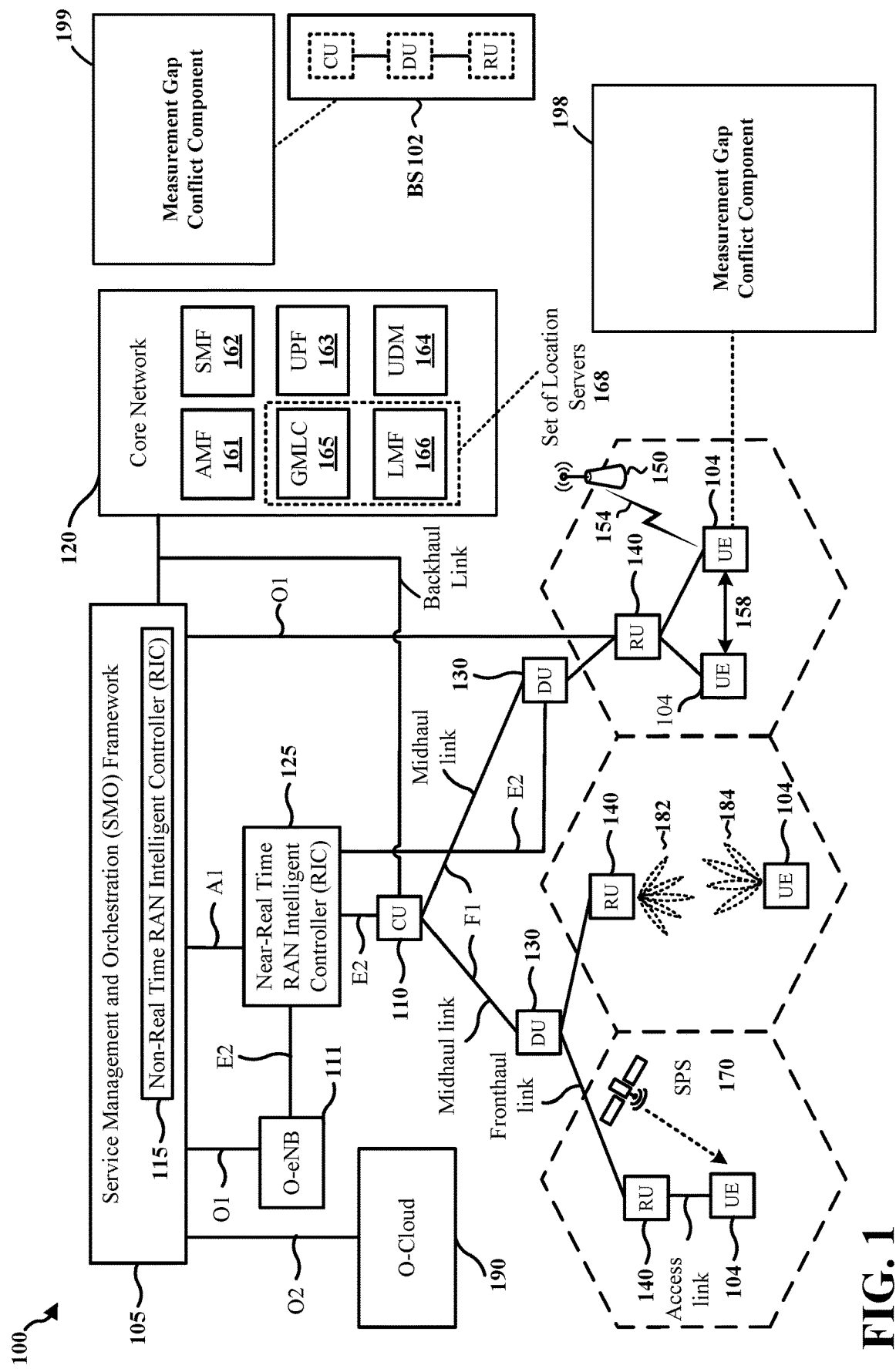
FIG. 1 is a diagram illustrating an example of a wireless communications system and an access network.

A wireless communication network, such as a 5G NR network, may be designed to include measurement gaps (MGs) that allow user equipment (UE) to prevent radio link failures in mobility scenarios. However, MGs may prevent the UE from transmitting uplink (UL) data based on the MGs having a higher priority, and increasing the latency for such UL traffic may risk decreasing reliability and UL capacity. For instance, MGs prioritized over UL traffic for a UE may cause transmission of UL data on next available UL resources to be delayed due to the MG interval, which in turn may result in the packet delay budget (PDB) of the uplink UL data being exceeding and causing the UL data to become obsolete/discarded. Aspects described herein for resolving scheduling request (SR), buffer status report (BSR), and/or physical uplink shared channel (PUSCH) data delay from MG conflict for low latency provide enhancements to latency handling for UL traffic in a wireless network, such as a 5G NR network among other example networks, in which MGs are utilized.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a measurement gap conflict component 198 ("component 198") that is configured to obtain a configuration of a delay threshold associated with a uplink (UL) packet data convergence protocol (PDCP) queuing delay for a transmission buffer. The component 198 is also configured to measure a packet buffer time in which at least one UL data packet is in the transmission buffer, where the at least one UL data packet is associated with a scheduling request (SR), a buffer status report (BSR), or physical uplink shared channel (PUSCH) data. The component 198 is further configured to transmit, for a network node, at least one of the SR, the BSR, or the PUSCH data during a portion of a measurement gap (MG) in a MG interval or outside of the MG based on the packet buffer time being less than or greater than or equal to the delay threshold. In aspects, the component 198 may be configured to cancel at least the portion of the MG in the MG interval if the packet buffer time is greater than or equal to the delay threshold. In aspects, the component 198 may be configured to compare the packet buffer time to the delay threshold to generate a delay comparison, where at least one of the SR, the BSR, or the PUSCH data is transmitted during the MG or outside of the MG based on the delay comparison. In aspects, to obtain the configuration of the delay threshold, the component 198 may be configured to receive, from the network node, the configuration of the delay threshold via at least one of radio resource control (RRC) signaling, a medium access control (MAC) control element (MAC-CE), or downlink control information (DCI). In aspects, the component 198 may be configured to receive, from the network node and subsequent to receiving the configuration of the delay threshold, an updated configuration of the delay threshold via at least one of subsequent RRC signaling, a subsequent MAC-CE, or subsequent DCI. In aspects, the component 198 may be configured to receive non-scheduling or scheduling downlink control information (DCI) that includes an indication to prioritize at least one of the SR or the BSR over the MG, where the component 198 is configured to transmit at least one of the SR, the BSR, or the PUSCH data during the portion of the MG in the MG interval is based on the indication to prioritize at least one of the SR or the BSR over the MG. In certain aspects, the base station 102 may include a measurement gap conflict component 199 ("component 199") that is configured to configure a delay threshold associated with an uplink (UL) packet data convergence protocol (PDCP) queuing delay for a transmission buffer of a user equipment (UE). The component 199 is also configured to transmit a configuration of the delay threshold associated with the UL PDCP queuing delay in the transmission buffer. The component 199 is further configured to receive, from the UE, at least one of a scheduling request (SR), a buffer status report (BSR), or physical uplink shared channel (PUSCH) data during a portion of a measurement gap (MG) in a MG interval or outside of the MG based on a packet buffer time being less than or greater than or equal to the delay threshold, where the packet buffer time is a time in which at least one UL data packet is in the transmission buffer. In aspects, the component 199 may be configured to transmit, subsequent to transmitting the configuration of the delay threshold, an updated configuration of the delay threshold via at least one of subsequent RRC signaling, a subsequent MAC-CE, or subsequent DCI. Although the following description may be focused on 5G NR, the concepts described herein may be applicable to other similar areas, such as LTE, LTE-A, CDMA, GSM, and other wireless technologies.

Figure 2:
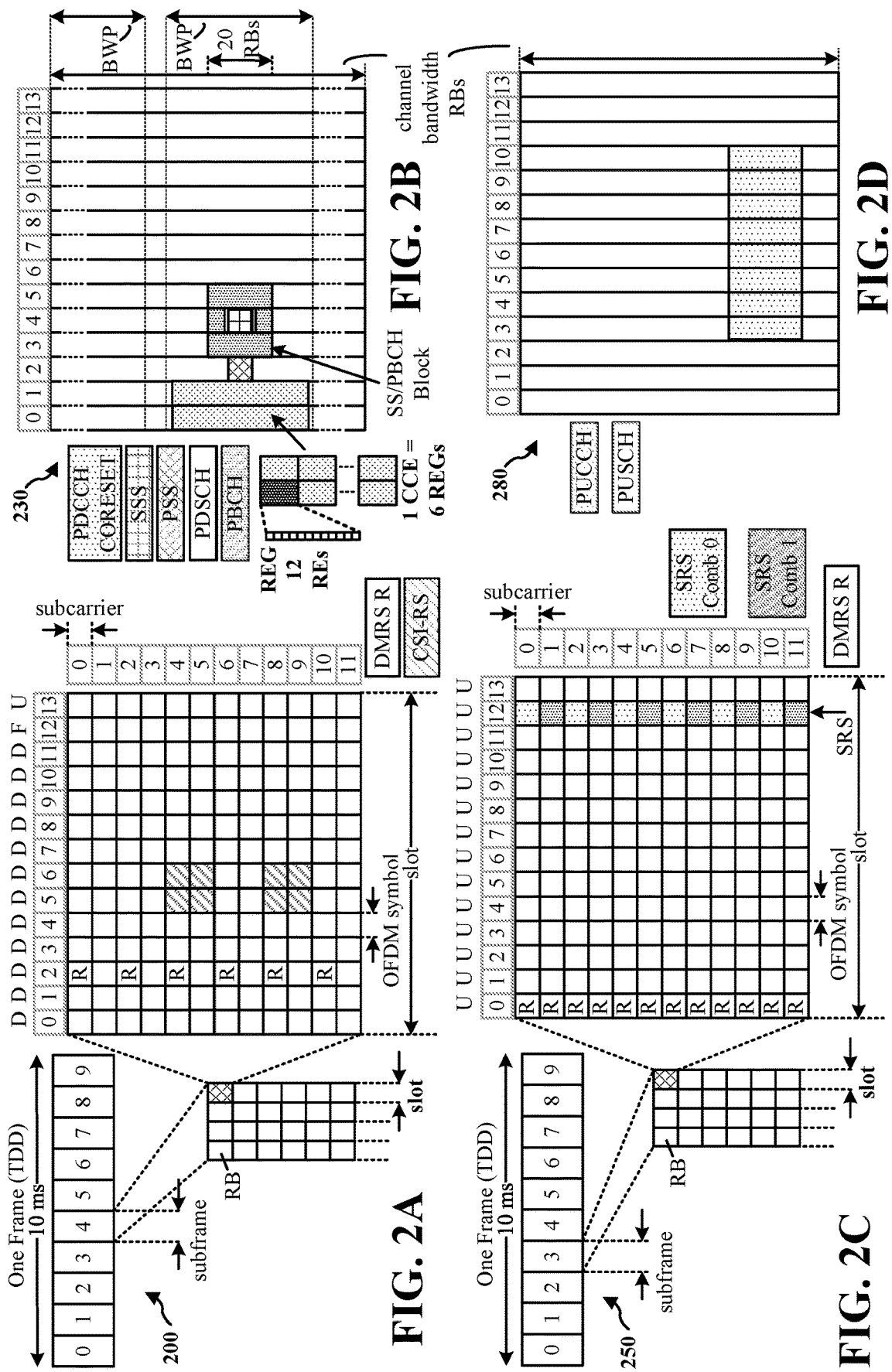
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS Δf = $2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
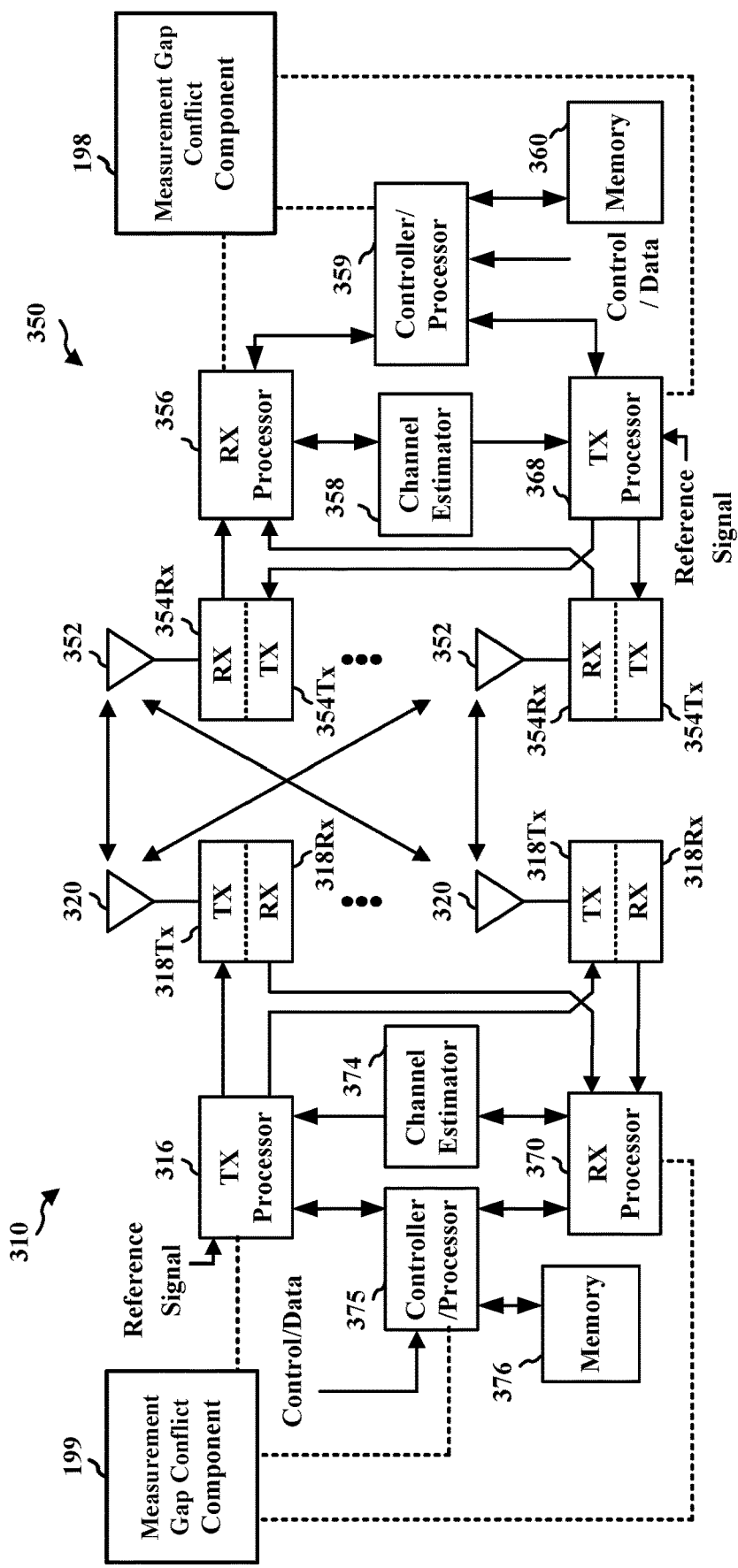
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TB s), demultiplexing of MAC SDUs from TB s, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the measurement gap conflict component 198 of FIG. 1. At least one of the TX processor 316, the RX processor 370, and the controller/processor 375 may be configured to perform aspects in connection with the measurement gap conflict component 199 of FIG. 1.

Aspects described herein for resolving SR, BSR, and/or PUSCH data delay from MG conflict for low latency provide enhancements to latency handling for UL traffic in a wireless network, such as a 5G NR network among other example networks, in which MGs are utilized. When MGs are prioritized over UL traffic for a UE, transmission of UL data on a next available UL resource may be delayed due to the MG interval, which may result in the packet delay budget (PDB) of the uplink UL data being exceeding and causing the UL data to become obsolete/discarded.

For instance, some configurations may prohibit SRs from being transmitted by a UE when the next SR opportunity falls in a MG interval (e.g., similar to prohibitions for SR-Prohibit timers, a DL PDCCH with UL resources being received, etc.). When UL traffic arrives at the UE transmission buffer, an SR may be triggered if certain triggering conditions are satisfied. If the UL data packet has been queued/waiting in the UE's transmission buffer for a long time, it may be useful for the UE to quickly send an SR (e.g., and utilize the next available SR opportunity) requesting a network node (e.g., a BS and/or the like) to grant UL resources to the UE for transmission of the UL data packet. However, if the next available UL SR resource falls in the MG interval, the UE may not be allowed to transmit the SR, causing the latency to increase as the UE has to wait for the next SR opportunity based on SR periodicity. Thus, the UL PDB may be exceeded which decreases reliability and UL capacity.

While MGs (e.g., gaps in a UE's active bandwidth part (BWP) during which downlink signaling is measured) may be important and/or prioritized for a UE over other procedures for mobility scenarios (e.g., to prevent radio link failure), aspects herein provide for balancing MG and UL traffic priorities to prevent decreases in latency, reliability, and UL capacity for delay-impacted UL traffic. That is, aspects provide for prioritization between SR/BSR/PUSCH data transmissions and MG if certain conditions are satisfied. For example, a UE may obtain a configuration of a delay threshold associated with an UL PDCP queuing delay for a transmission buffer, measure a packet buffer time in which a UL data packet(s) is in the transmission buffer (e.g., SR/BSR/PUSCH data), and transmit the UL data packet(s) during a portion of a MG in a MG interval or outside of the MG based on the packet buffer time being less than or greater than or equal to the delay threshold.

Accordingly, the described aspects enable a UE to cancel at least a portion of a MG in certain circumstances and/or under certain conditions in order to transmit delay-impacted UL traffic (e.g., SR/BSR/PUSCH data).

Figure 4:
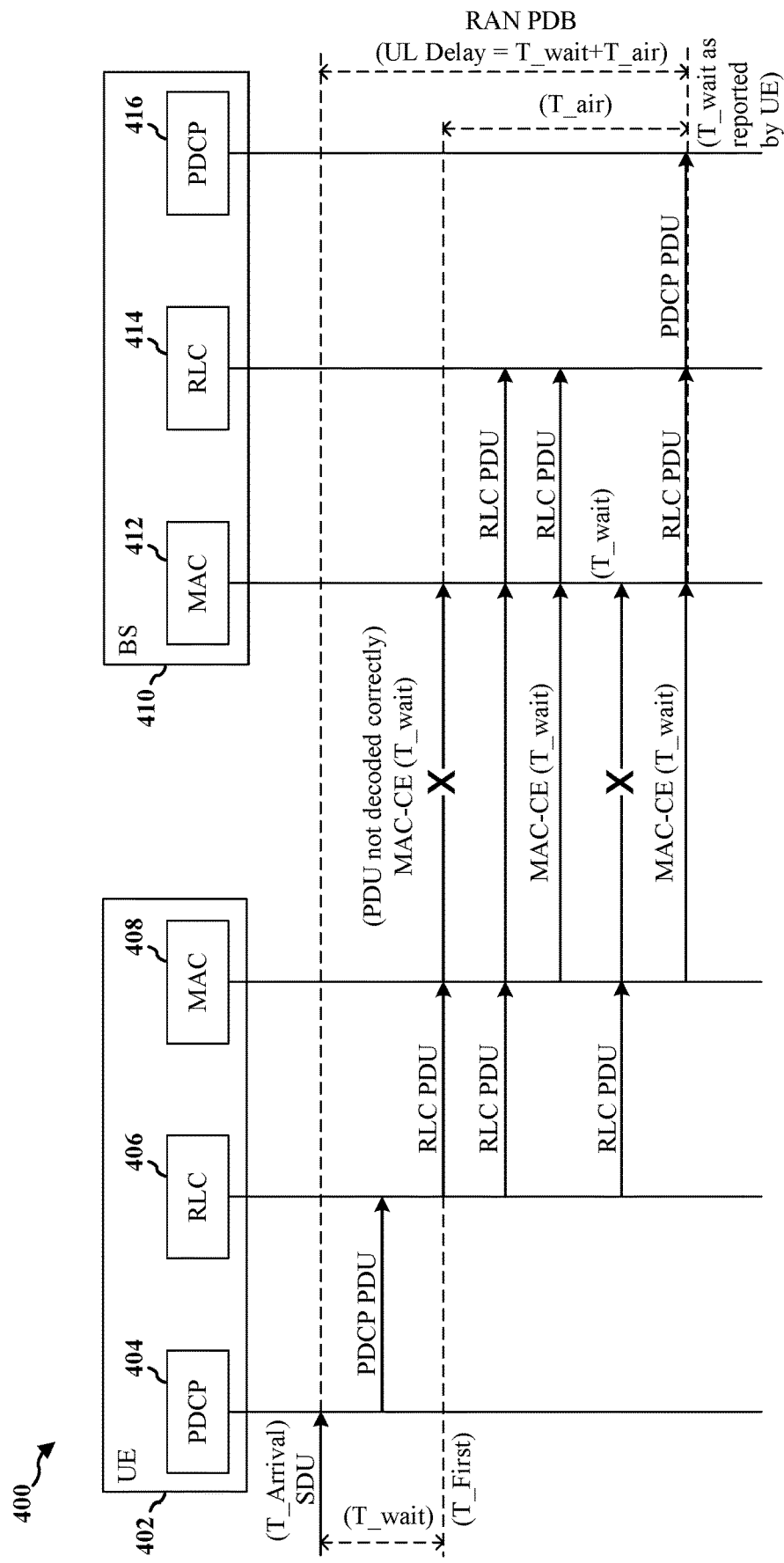
FIG. 4 is a call flow diagram illustrating an example UL timing delay, in accordance with various aspects of the present disclosure.

FIG. 4 is a call flow diagram 400 illustrating an example UL timing delay, in various aspects. Call flow diagram 400 includes a UE 402 and a BS 410 communicating UL traffic. UE 402 is shown as including a PDCP transmission buffer 404 (e.g., a queue), RLC 406, and MAC 408; and BS 410 is shown as including MAC 412, RLC 414, and a PDCP reception buffer 416. UL timing delay may be described with reference to an UL PDB (also "PDB" herein) that may include delay portions between a UE and a network node (e.g., a RAN PDB portion), delay portions between a network node and an application server (e.g., a core network PDB), delay portions between a UE and an application server (e.g., an end-to-end PDB), etc., including residual PDB, and remaining PDB. Aspects herein are described in the context of RAN PDB, but such descriptions are by way of example and not limitation.

As shown in call flow diagram 400, The UL delay at the air interface (e.g., a RAN PDB portion) may be broken down into portions of time: T_Air and T_wait, where the UL Delay=T_Air+T_wait, and T_wait is the waiting time, or the UL PDCP queuing delay, for a transmission buffer of the UE 402. When an SDU with data for a PDU arrives in the PDCP transmission buffer 404 queue of the UE 402, the UE 402 stores the SDU arrival time as T_Arrival. When the UE 402 transmits the first MAC layer 408 PDU that contains data from the SDU (e.g., at time T_First), the UE 402 waiting time/UL PDCP queuing delay of that SDU is T_wait, where T_wait=T_First−T_Arrival. The time T_Air may be described as a time difference from the first reception (even if unsuccessful) of the MAC 406 PDU that contains the MAC CE or BSR to the successful reception of the last MAC 408 PDU carrying data from the SDU.

Regarding the time T_wait, this delay or waiting time may be unknown at network node/BS, which prohibits the network node/BS from determining the actual delay that the UL data packet waiting to be transmitted is experiencing. In this context, aspects described herein for resolving SR, BSR, and/or PUSCH data delay from MG conflict for low latency provide enhancements to latency handling for UL traffic.

Figure 5:
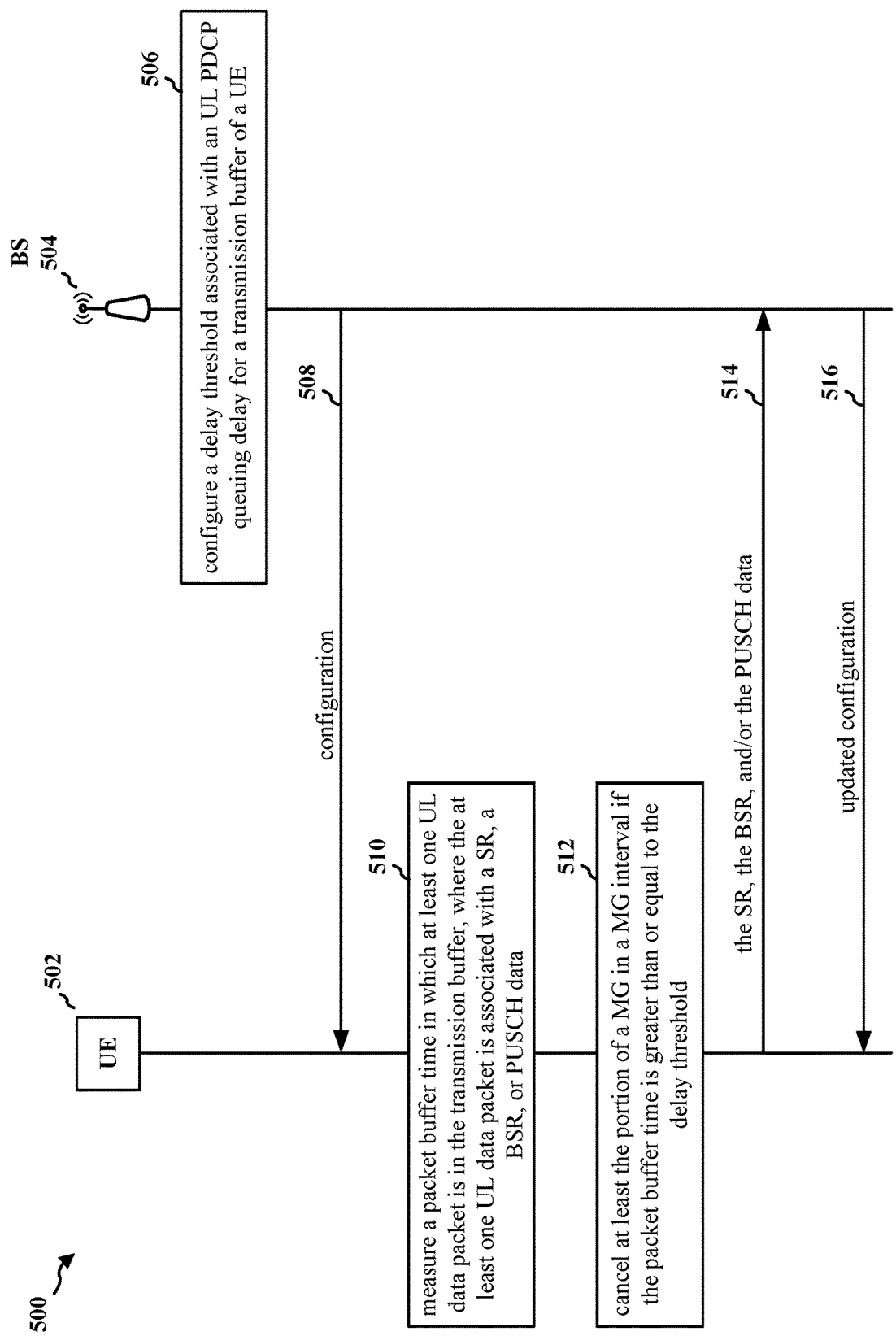
FIG. 5 is a call flow diagram for wireless communications, in accordance with various aspects of the present disclosure.

FIG. 5 is a call flow diagram 500 for wireless communications, in various aspects. Call flow diagram 500 illustrates resolving SR, BSR, and/or PUSCH data delay from MG conflict for low latency provide enhancements to latency handling for UL traffic, and illustrates configuring a UE 502 to manage its MG to allow for UL traffic transmission, based on certain conditions, to a network node (e.g., a base station (BS) 504, such as a gNB or other type of base station, by way of example, as shown). Aspects described for the BS 504 may be performed by the base station in aggregated form and/or by one or more components of the base station in disaggregated form.

In the illustrated aspect, the BS 504 may configure (at 506) a delay threshold associated with an UL PDCP queuing delay for a transmission buffer of the UE 502. In aspects, the BS 504 thus generates or specifies a configuration 508. The UE 502 may obtain the configuration 508. In aspects, the configuration 508 may be of a delay threshold associated with UL PDCP queuing delay for the transmission buffer of the UE 502. The configuration 508 may be obtained by receiving (e.g., via RRC, MAC-CE, DCI, etc.) the configuration 508 from the BS 504. In aspects, the delay threshold associated with the UL PDCP queuing delay for the transmission buffer may be further associated with a remaining PDB, a PDB, and/or quality of service (QoS) flow attributes. QoS may be enforced at the QoS flow level, e.g., each QoS flow packet is classified and marked using a QoS flow identifier (QFI), and in 5G-NR, QoS flows may be mapped in the access network to data radio bearers (DRBs) unlike in 4G where mapping is one to one between the evolved packet core (EPC) and radio bearers. 5G QoS architecture supports following QoS flow types. In aspects, the configuration 508 may include a second configuration for an amount of MG to shorten or cancel, as described below, while in other aspects, the second configuration may be separately obtained by the UE 502.

The UE 502 may be configured to measure (at 510) a packet buffer time in which at least one UL data packet is in the transmission buffer. In aspects, the at least one UL data packet may be associated with a SR, a BSR, and/or PUSCH data. In aspects, the UL data packet may be at least one UL PDU. The measure (at 510) of the packet buffer time may be may be compared to the delay threshold to generate a delay comparison by the UE 502.

The UE 502 may be configured to cancel (at 512) at least the portion of a MG in a MG interval if the packet buffer time is greater than or equal to the delay threshold. In aspects, a delay threshold, or a latency threshold, may be a remaining uplink delay budget, a remaining PDB, and or the like. In aspects, the UE 502 may be configured to cancel the MG in whole or in part, to shift the MG and associated MG interval with respect to time, to shorten the MG, to split the MG, and/or the like. The UE 502, to cancel (at 512) at least the portion of the MG in the MG interval, may be configured to shorten the MG to exclude at least the portion of the MG in the MG interval. The UE 502 may be configured to shorten the MG to exclude at least the portion of the MG in the MG interval based on an amount of the MG to be shortened, where the amount of the MG to be shortened is based on the second configuration from the BS 504 described above. In aspects, the packet buffer time may be associated with a timer over the MG for an arrival of a data packet, and the UE 502 may be configured to cancel at least the portion of the MG in the MG interval based on the UL PDCP queuing delay and the timer. The UE 502 may be configured to cancel (at 512) at least the portion of the MG be based on non-scheduling/scheduling DCI prioritization for SR/BSR, in aspects. Additionally, it should be understood that the UE 502 may be configured to cancel (at 512) at least the portion of a MG in preparation to transmit the UL data packet, e.g., in a canceled portion of the MG.

The UE 502 may be configured to transmit the SR, the BSR, and/or the PUSCH data (e.g., UL data 514) during the portion of the MG in the MG interval, e.g., a canceled portion, or outside of the MG. In aspects, the SR, the BSR, and/or the PUSCH data (UL data 514) may be transmitted to the BS 504. The UE 502 may be configured to transmit the SR, the BSR, and/or the PUSCH data (UL data 514) based on the packet buffer time being less than or greater than or equal to the delay threshold, based on DCI, and/or the like, in various aspects. In one aspect, to transmit the SR, the BSR, and/or the PUSCH data (UL data 514), the UE 502 may be configured to transmit the UL data 514 during the MG if the packet buffer time is less than the delay threshold. In one aspect, to transmit the SR, the BSR, and/or the PUSCH data (UL data 514), the UE 502 may be configured to transmit the UL data 514 outside of the MG if the packet buffer time is greater than or equal to the delay threshold.

In one aspect, a BSR (e.g., as UL data 514) may be included in a PUSCH, and the UE 502 may be configured to transmit the BSR during the portion of the MG in the MG interval based at least in part on a priority of the BSR. In one aspect, a BSR (e.g., as UL data 514) may be a periodic BSR and may be carried by a PUSCH, where the UE 502 may be configured to transmit the BSR during the portion of the MG in the MG interval based at least in part on a priority of the BSR and remaining PDBs of each BSR in each logical channel group (LCG) associated with the UE 502. In one aspect, the UE 502 may be configured to transmit a SR (e.g., as UL data 514) during the portion of the MG in the MG interval based at least in part on a transition time (TR) for radio frequency (RF) tuning associated with the MG, a start of the MG, and/or an end of the MG. In the aspects, the UE 502 may be configured to transmit the SR outside of the TR and within the MG.

In one aspect, PUSCH data (e.g., as UL data 514) may follow a prior SR that may indicate a priority or a remainder of a PDB and that may include an UL dynamic grant (DG) or an activation of a configured grant (CG). In the aspect, the UE 502 may be configured to transmit the PUSCH data based on the prior SR that indicates the priority and/or the remainder of the PDB. In the aspect, the UE 502 may be configured to transmit the PUSCH data outside of a TR for RF tuning associated with the MG and within the MG.

Subsequent to transmitting the SR, the BSR, and/or the PUSCH data (e.g., UL data 514), the UE 502 may receive an updated configuration 516 of the delay threshold via at least one of subsequent RRC signaling, a subsequent MAC-CE, or subsequent DCI. The updated configuration 516 may include additional configuration for a new amount of MG to cancel, shorten, split, shift, etc., may be configured by the BS 504 as similarly described at 506 above for the configuration 508, and the updated configuration may be based at least on updated UE delay parameters, mobility, positioning, and/or the like, for the UE 502, and/or on network load, network delay parameters, and/or the like, determined or obtained by the BS 504.

Figure 6:
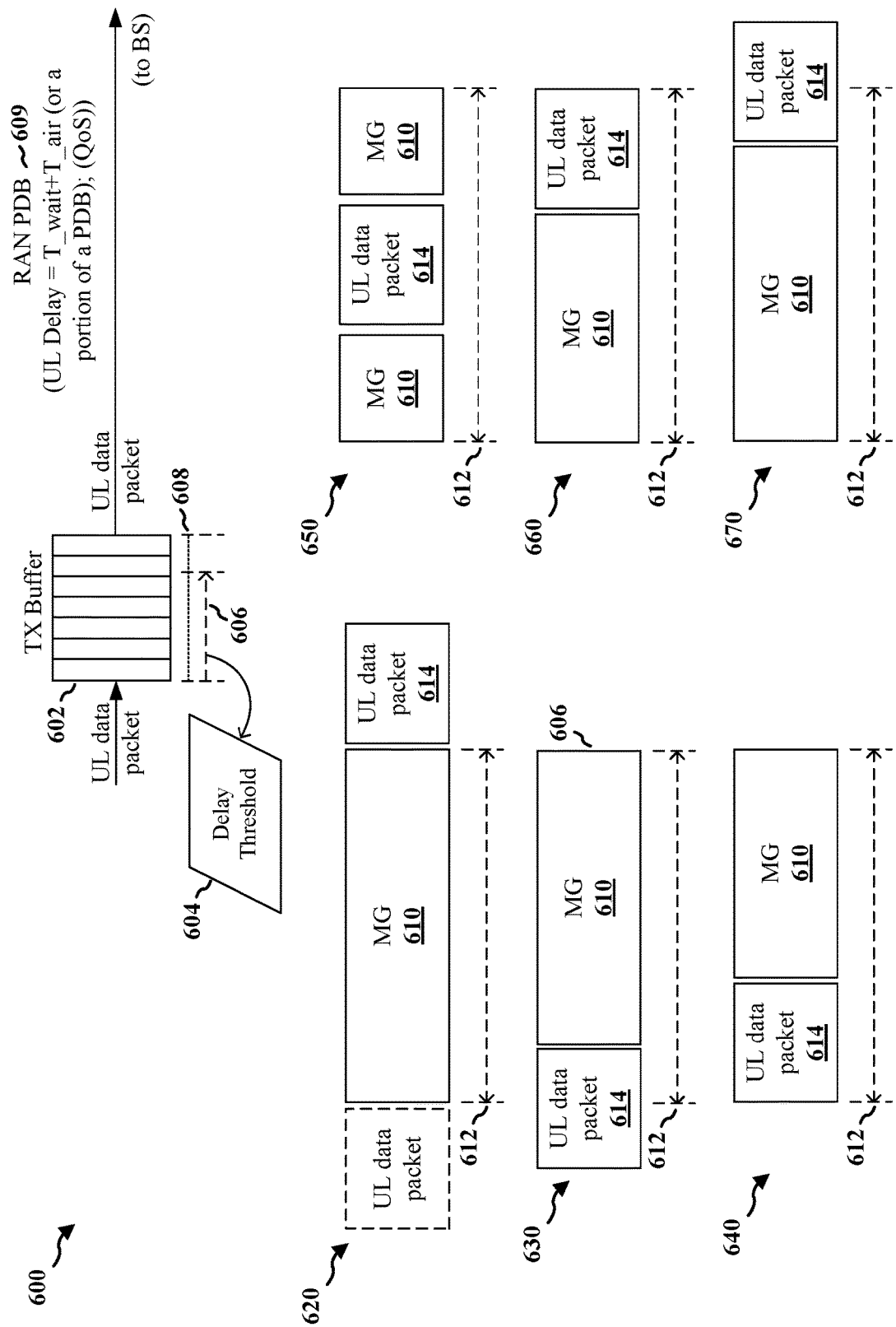
FIG. 6 is a diagram for measurement gap configurations for UL data, in accordance with various aspects of the present disclosure.

FIG. 6 is a diagram 600 for measurement gap configurations for UL data, in various aspects. Diagram 600 illustrates a transmission buffer 602 of a UE (e.g., UE 502 in FIG. 5) which receives and queues an UL data packet for transmission to a BS. The transmission buffer 602 may queue the UL data packet for a packet buffer time 606 that is compared to a delay threshold 604, which may be configured by the BS, as similarly described above with reference to FIG. 5. The delay threshold 604 may be associated with a UL PDCP queuing delay 608 of the transmission buffer 602. Also illustrated in diagram 600, and associated with the UL data packet, is a PDB 609 (e.g., a RAN portion of a PDB), shown by way of example as UL Delay, similarly described with respect to FIG. 4.

As noted herein, a UE may prioritize the transmission of UL data from the transmission buffer 602 when certain conditions are met based on, e.g., the delay threshold 604, the packet buffer time 606, a type of UL data packet, the PDB 609, and/or the like. Under certain conditions, the UE may cancel a portion of a MG in order to transmit UL traffic, such as delay-impacted UL traffic. In aspects, a UE may be configured to cancel the MG in whole or in part, to shift the MG and associated MG interval with respect to time, to shorten the MG, to split the MG, and/or the like. Diagram 600 illustrates measurement gap configurations for prioritization and transmission of a UL data packet over a MG 610 with a MG interval 612.

In a configuration 620, the UL data packet 614 may be transmitted after (or before) the MG 610 completes. That is, the UL data packet 614 may be transmitted outside of the MG 610 that spans the MG interval 612. In a configuration 630, the UL data packet 614 may be transmitted in part over an early portion of the MG 610 within the MG interval 612. The early portion of the MG 610 in which the UL data packet 614 is prioritized may be canceled (or a remaining portion of the MG 610 may be shortened). In a configuration 640, the UL data packet 614 may be transmitted in its entirety over an early portion of the MG 610 within the MG interval 612. The early portion of the MG 610 in which the UL data packet 614 is prioritized may be canceled (or a remaining portion of the MG 610 may be shortened).

In a configuration 650, the UL data packet 614 may be transmitted in its entirety over a middle portion of the MG 610 within the MG interval 612. The middle portion of the MG 610 in which the UL data packet 614 is prioritized may be canceled (or the MG 610 may be split into an early portion and a later portion that ends with the MG interval 612). In a configuration 660, the UL data packet 614 may be transmitted in its entirety over a later portion of the MG 610 within the MG interval 612. The later portion of the MG 610 in which the UL data packet 614 is prioritized may be canceled (or a remaining portion of the MG 610 may be shortened). In a configuration 670, the UL data packet 614 may be transmitted in part over a later portion of the MG 610 within the MG interval 612. The later portion of the MG 610 in which the UL data packet 614 is prioritized may be canceled (or a remaining portion of the MG 610 may be shortened).

A UE may be configured to autonomously shorten or cancel the MG 610 based on the remaining PDB when compared to threshold, where the amount of shortening/canceling may be based on a configuration from the network node (e.g., a BS).

In aspects, while not shown for illustrative clarity, it is contemplated that one or more of the configurations 630, 640, 650, 660, 670, may include canceling the MG 610 in its entirety instead of canceling a portion of the MG 610.

Figure 7:
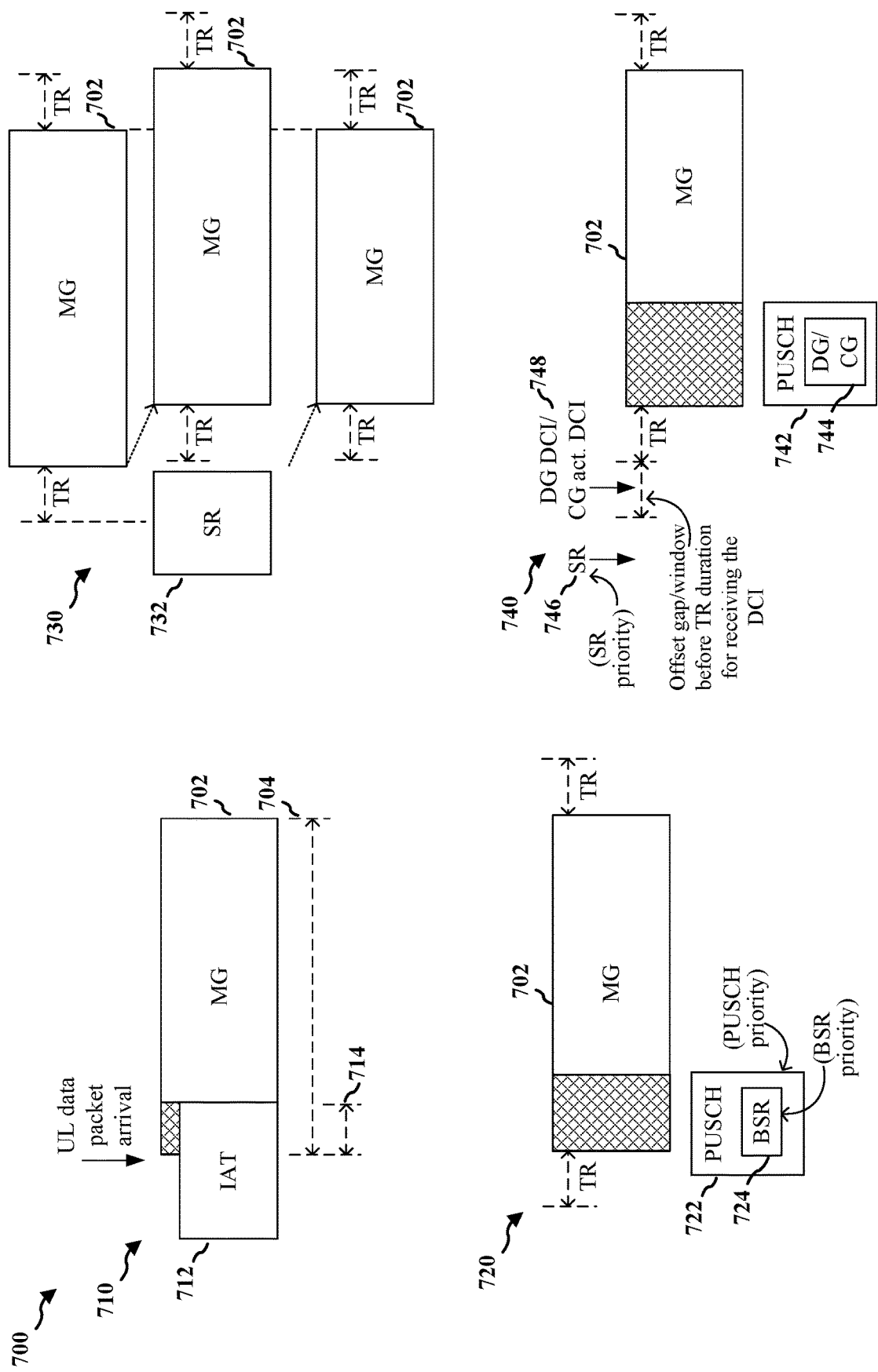
FIG. 7 is a diagram for measurement gap configurations for UL data, in accordance with various aspects of the present disclosure.

FIG. 7 is a diagram 700 for measurement gap configurations for UL data, in various aspects. Diagram 700 illustrates four example measurement gap configurations for UL data with respect to a MG 702 that has an associated MG interval 704 (shown once for brevity and illustrative clarity). As generally described above with respect to FIG. 6, a UE may prioritize the transmission of UL data from its transmission buffer when certain conditions are met based on, e.g., a delay threshold, a packet buffer time, a type of UL data packet, a PDB, and/or the like. Under certain conditions, the UE may cancel a portion of a MG in order to transmit UL traffic, such as delay-impacted UL traffic. In aspects, a UE may be configured to cancel the MG in whole or in part, to shift the MG and associated MG interval with respect to time, to shorten the MG, to split the MG, and/or the like.

In a configuration 710 with respect to the MG 702, an inactivity timer (IAT) 712 may be utilized by a UE create a period of inactivity 714 during which an anticipated UL data packet (e.g., SR/BSR/PUSCH data) may arrive for transmission. In such a configuration, the portion of the MG 702 overlapping the IAT 712 may be canceled, the portion of the MG 702 overlapping the IAT 712 may be held inactive with respect to its MG process, the remaining portion of the MG 702 may be shortened, and/or the like. In other words, the UE packet buffer time described herein may be associated with a timer over the MG for an arrival of a data packet, and canceling at least a portion of the MG in the MG interval may be based on the UL PDCP queuing delay and the timer.

In a configuration 720 with respect to the MG 702, the MG 702 may include transition times (TRs) for radio frequency (RF) tuning associated with the MG 702. When UL data includes a BSR 724 carried in a PUSCH 722, the priority of the BSR 724 and/or of the PUSCH 722 may be considered to cancel at least a portion of the MG 702. That is, when a BSR is included in a PUSCH, a UE may be configured to transmit the BSR during the portion of the MG that is canceled in the MG interval based at least in part on a priority of the BSR (e.g., a higher priority BSR may prompt canceling a portion of the MG 702, in aspects, while a lower priority BSR may not prompt canceling the portion of the MG 702, in other aspects). The portion of the MG 702 in which the PUSCH 722 is transmitted may be canceled or shortened by the UE.

In aspects of configuration 720 where the BSR 724 is a periodic BSR and is carried by the PUSCH 722, a UE may be configured to transmit the BSR 724 during the portion of the MG 702 in the MG interval based at least in part on a priority of the BSR 724 and remaining PDBs of each BSR in each LCG associated with the UE. In aspects of configuration 720 where the BSR 724 is an aperiodic BSR associated with a prior SR, a UE may be configured to transmit the BSR 724 during the portion of the MG 702 in the MG interval based at least in part on an SR priority of the prior SR and remaining PDBs of each data packet associated with each LCG associated with the UE.

In a configuration 730 with respect to the MG 702, the MG 702 may include TRs for RF tuning associated with the MG 702. A UE may be configured to transmit an SR 732 during the portion of the MG 702 in the MG interval in the configuration 730 based at least in part on a TR for RF tuning associated with the MG 702, a start of the MG 702, or an end of the MG 702. That is, the SR 732 may be configured to be transmitted before the TR or after the TR of the MG 702, before the MG 702 and within the TR, after the MG 702 and during the TR, etc. In other words, the UE may determine to prioritize the SR 732 or the MG 702 based on whether the SR 732 occasion occurs within TR or not, so it is not just overlapping. In aspects, a UE may be configured to transmit the SR 732 outside of the TR and within the MG 702. A portion of the MG 702 adjacent, prior to, subsequent to, etc., the SR 732 that is transmitted may be shortened, canceled, and/or shifted by the UE, in aspects.

In a configuration 740 with respect to the MG 702, the MG 702 may include TRs for RF tuning associated with the MG 702. Configuration 740 may illustrate an implicit prioritization of UL data over the MG 702 based on an SR. For instance, when PUSCH data 742, which may include a DG or CG 744, follows a prior SR 746 that indicates a priority or a remainder of a PDB and that includes an UL dynamic grant (DG) or an activation of a configured grant (CG) (748), a UE may be configured to transmit the PUSCH data 742 based on the prior SR 746 that indicates the priority or the remainder of the PDB. In aspects for the configuration 740, the UE may include a time offset (or an offset gap/time window) prior to the leading TR instance in which the DG DCI or the CG DCI activation are received. The portion of the MG 702 in which the SR 732 is transmitted may be canceled or shifted by the UE.

Figure 8:
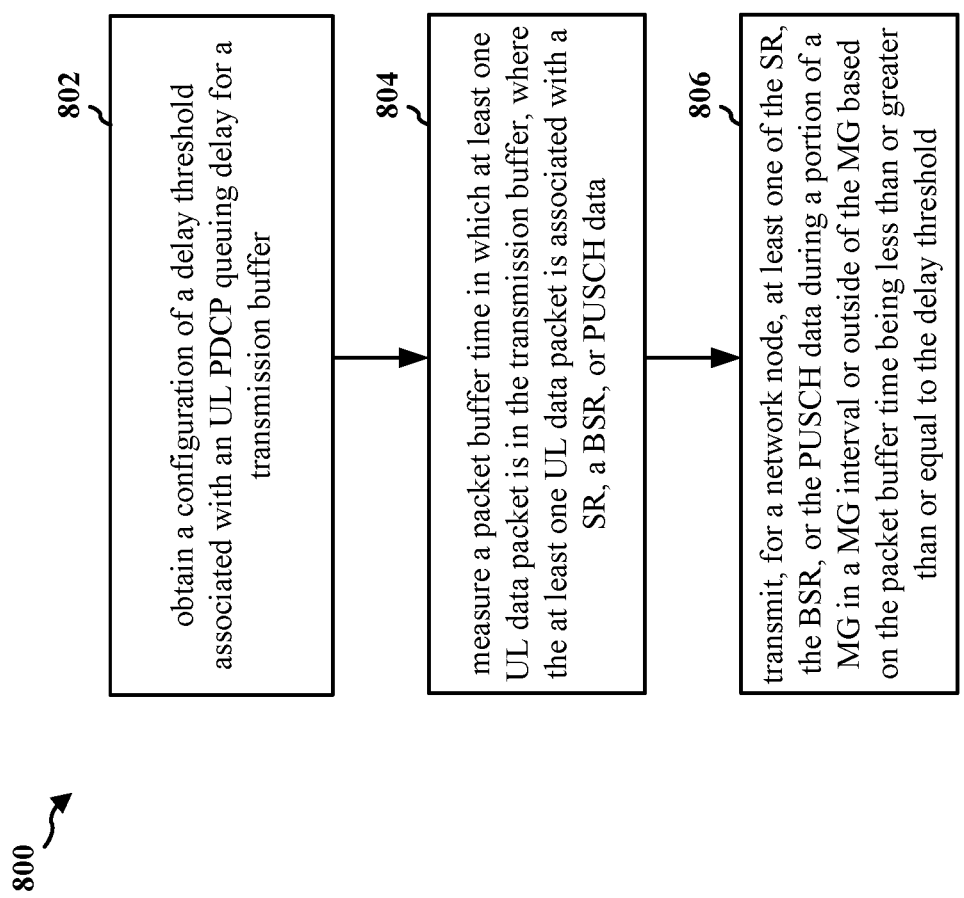
FIG. 8 is a flowchart of a method of wireless communication, in accordance with various aspects of the present disclosure.

FIG. 8 is a flowchart 800 of a method of wireless communication, in various aspects. The method may be performed by a UE (e.g., the UE 104; the UE 402; the UE 502; the apparatus 1204). At 802, the UE obtains a configuration of a delay threshold associated with an uplink (UL) packet data convergence protocol (PDCP) queuing delay for a transmission buffer. In some aspects, 802 may be performed by component 198. For example, and with reference to FIGS. 5-7, the UE 502 may obtain a configuration 508. In aspects, the BS 504 may configure (e.g., at 506) a delay threshold (e.g., 604 in FIG. 6) associated with an UL PDCP queuing delay (e.g., 608 in FIG. 6) for a transmission buffer (e.g., 602 in FIG. 6) of the UE 502. In aspects, the BS 504 thus generates or specifies a configuration 508. In aspects, the configuration 508 may be of a delay threshold (e.g., 604 in FIG. 6) associated with UL PDCP queuing delay (e.g., 608 in FIG. 6) for the transmission buffer (e.g., 602 in FIG. 6) of the UE 502. The configuration 508 may be obtained at the UE by receiving (e.g., via RRC, MAC-CE, DCI, etc.) the configuration 508 from the BS 504. In aspects, the delay threshold (604 in FIG. 6) associated with the UL PDCP queuing delay (e.g., 608 in FIG. 6) for the transmission buffer (e.g., 602 in FIG. 6) may be further associated with a remaining PDB, a PDB, and/or quality of service (QoS) flow attributes (e.g., 609 in FIG. 6). In aspects, the configuration 508 may include a second configuration for an amount of MG to shorten or cancel, as described below, while in other aspects, the second configuration may be separately obtained by the UE 502.

At 804, the UE measures a packet buffer time in which at least one UL data packet is in the transmission buffer, where the at least one UL data packet is associated with a scheduling request (SR), a buffer status report (BSR), or physical uplink shared channel (PUSCH) data. In some aspects, 904 may be performed by component 198. For example, again with reference to FIGS. 5-7, the UE 502 may be configured to measure (at 510) a packet buffer time (e.g., 608 in FIG. 6) in which at least one UL data packet is in the transmission buffer (e.g., 602 in FIG. 6). In aspects, the at least one UL data packet may be associated with a SR, a BSR, and/or PUSCH data. In aspects, the UL data packet may be at least one UL PDU. The measure (at 510) of the packet buffer time (e.g., 608 in FIG. 6) may be may be compared to the delay threshold (e.g., 604 in FIG. 6) to generate a delay comparison by the UE 502.

Finally, at 806, the UE transmits, for a network node, at least one of the SR, the BSR, or the PUSCH data during a portion of a measurement gap (MG) in a MG interval or outside of the MG based on the packet buffer time being less than or greater than or equal to the delay threshold. In some aspects, 906 may be performed by component 198. For example, again with reference to FIGS. 5-7, the UE 502 may be configured to transmit the SR, the BSR, and/or the PUSCH data (e.g., UL data 514) during the portion of the MG in the MG interval, e.g., a canceled portion, or outside of the MG (620, 630, 640, 650, 660, 670 in FIG. 6; 710, 720, 730, 740 in FIG. 7). In aspects, the SR, the BSR, and/or the PUSCH data (e.g., UL data 514) may be transmitted to the BS 504. The UE 502 may be configured to transmit the SR, the BSR, and/or the PUSCH data (UL data 514) based on the packet buffer time (e.g., 608 in FIG. 6) being less than or greater than or equal to the delay threshold (e.g., 604 in FIG. 6), based on DCI, and/or the like, in various aspects. In one aspect, to transmit the SR, the BSR, and/or the PUSCH data (e.g., UL data 514), the UE 502 may be configured to transmit the UL data 514 during the MG if the packet buffer time (e.g., 608 in FIG. 6) is less than the delay threshold (e.g., 604 in FIG. 6). In one aspect, to transmit the SR, the BSR, and/or the PUSCH data (e.g., UL data 514), the UE 502 may be configured to transmit the UL data 514 outside of the MG if the packet buffer time (e.g., 608 in FIG. 6) is greater than or equal to the delay threshold (e.g., 604 in FIG. 6).

Figure 9:
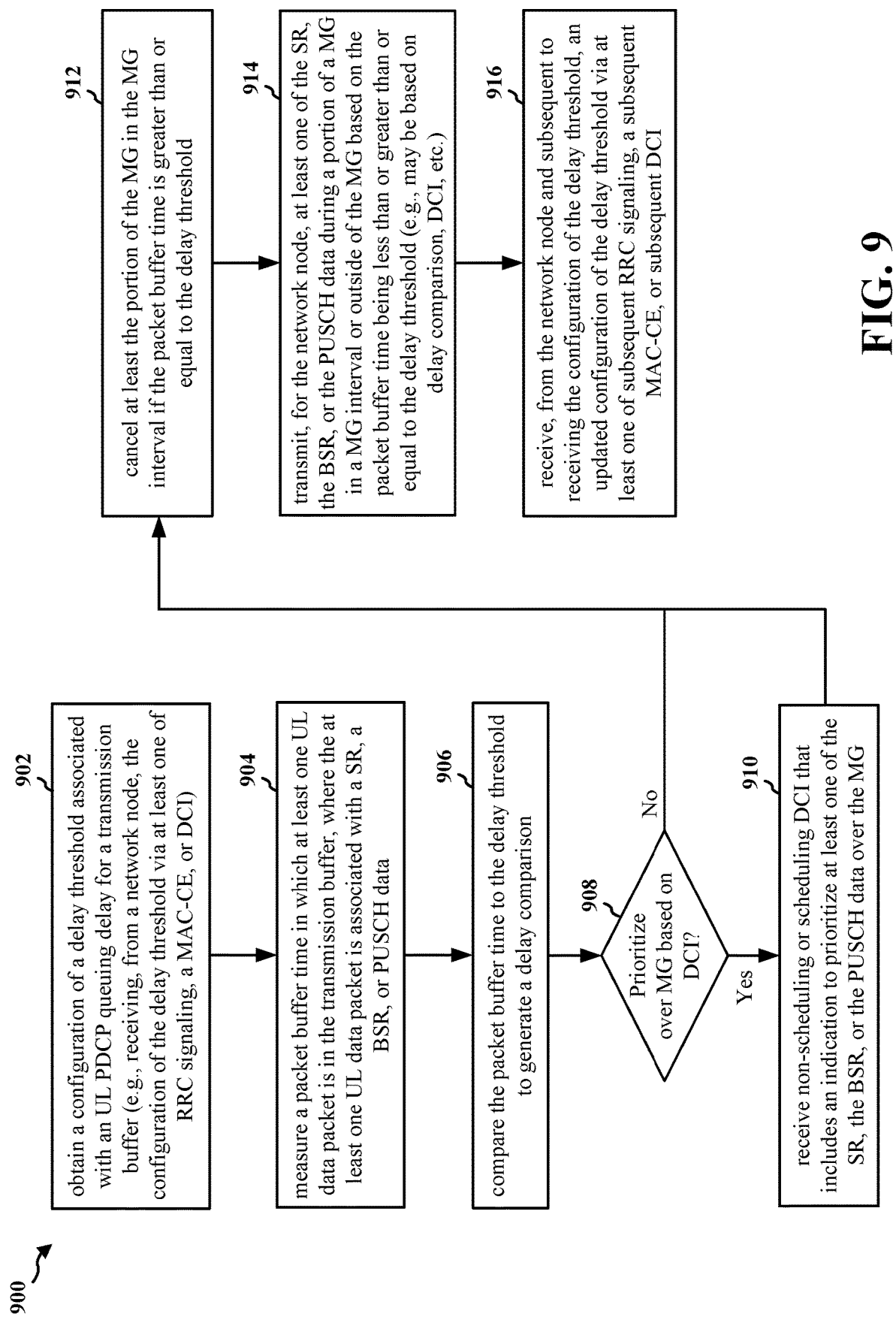
FIG. 9 is a flowchart of a method of wireless communication, in accordance with various aspects of the present disclosure.

FIG. 9 is a flowchart 900 of a method of wireless communication, in various aspects. The method may be performed by a UE (e.g., the UE 104; the UE 402; the UE 502; the apparatus 1204). At 902, the UE obtains a configuration of a delay threshold associated with an uplink (UL) packet data convergence protocol (PDCP) queuing delay for a transmission buffer. In some aspects, 802 may be performed by component 198. For example, and with reference to FIGS. 5-7, the UE 502 may obtain a configuration 508. In aspects, the BS 504 may configure (e.g., at 506) a delay threshold (e.g., 604 in FIG. 6) associated with an UL PDCP queuing delay (e.g., 608 in FIG. 6) for a transmission buffer (e.g., 602 in FIG. 6) of the UE 502. In aspects, the BS 504 thus generates or specifies a configuration 508. In aspects, the configuration 508 may be of a delay threshold (e.g., 604 in FIG. 6) associated with UL PDCP queuing delay (e.g., 608 in FIG. 6) for the transmission buffer (e.g., 602 in FIG. 6) of the UE 502. The configuration 508 may be obtained at the UE by receiving (e.g., via RRC, MAC-CE, DCI, etc.) the configuration 508 from the BS 504. In aspects, the delay threshold (e.g., 604 in FIG. 6) associated with the UL PDCP queuing delay (e.g., 608 in FIG. 6) for the transmission buffer (e.g., 602) may be further associated with a remaining PDB, a PDB, and/or quality of service (QoS) flow attributes (e.g., 609 in FIG. 6). In aspects, the configuration 508 may include a second configuration for an amount of MG to shorten or cancel, as described below, while in other aspects, the second configuration may be separately obtained by the UE 502.

At 904, the UE measures a packet buffer time in which at least one UL data packet is in the transmission buffer, where the at least one UL data packet is associated with a scheduling request (SR), a buffer status report (BSR), or physical uplink shared channel (PUSCH) data. In some aspects, 904 may be performed by component 198. For example, again with reference to FIGS. 5-7, the UE 502 may be configured to measure (at 510) a packet buffer time (e.g., 608 in FIG. 6) in which at least one UL data packet is in the transmission buffer (e.g., 602 in FIG. 6). In aspects, the at least one UL data packet may be associated with a SR, a BSR, and/or PUSCH data. In aspects, the UL data packet may be at least one UL PDU.

At 906, the UE compares the packet buffer time to the delay threshold to generate a delay comparison. In some aspects, 906 may be performed by component 198. For example, again with reference to FIGS. 5, 6, the UE 502 may compare the measure (at 510) of the packet buffer time (e.g., 608 in FIG. 6) with the delay threshold (e.g., 604 in FIG. 6) to generate a delay comparison.

At 908, the UE determines if prioritization of UL data over MG is based on DCI. In some aspects, 908 may be performed by component 198. For example, again with reference to FIGS. 5-7, the UE 502 may be configured to base prioritization over MGs on scheduling or non-scheduling DCI. If so, flowchart 900 proceeds to 912; if not, flowchart 900 proceeds to 910.

At 910, the UE receives non-scheduling or scheduling DCI that includes an indication to prioritize at least one of the SR, the BSR, or the PUSCH data over the MG. In some aspects, 190 may be performed by component 198. For example, The UE 502 may receive non-scheduling or scheduling DCI from BS 504 and transmit UL data (e.g., 514 in FIG. 5) as prioritized over MGs, as described herein, based on such DCI. It should also be noted that when DCI is utilized for prioritization, and the received non-scheduling or scheduling DCI includes an indication to not prioritize at least one of the SR, the BSR, or the PUSCH data over the MG, flowchart 900 may end or return to 904.

At 912, the UE cancels at least the portion of the MG in the MG interval if the packet buffer time is greater than or equal to the delay threshold. In some aspects, 912 may be performed by component 198. For example, the UE 502 may be configured to cancel (e.g., at 512) at least the portion of a MG in a MG interval if the packet buffer time is greater than or equal to the delay threshold. In aspects, the UE 502 may be configured to cancel the MG in whole or in part, to shift the MG and associated MG interval with respect to time, to shorten the MG, to split the MG, and/or the like. The UE 502, to cancel (e.g., at 512) at least the portion of the MG in the MG interval, may be configured to shorten the MG to exclude at least the portion of the MG in the MG interval. The UE 502 may be configured to shorten the MG to exclude at least the portion of the MG in the MG interval based on an amount of the MG to be shortened, where the amount of the MG to be shortened is based on the second configuration from the BS 504 described above. In aspects, the packet buffer time may be associated with a timer over the MG for an arrival of a data packet, and the UE 502 may be configured to cancel at least the portion of the MG in the MG interval based on the UL PDCP queuing delay and the timer. The UE 502 may be configured to cancel (e.g., at 512) at least the portion of the MG be based on non-scheduling/scheduling DCI prioritization for SR/BSR, in aspects. Additionally, it should be understood that the UE 502 may be configured to cancel (e.g., at 512) at least the portion of a MG in preparation to transmit the UL data packet, e.g., in a canceled portion of the MG.

At 914, the UE transmits, for a network node, at least one of the SR, the BSR, or the PUSCH data during a portion of a measurement gap (MG) in a MG interval or outside of the MG based on the packet buffer time being less than or greater than or equal to the delay threshold. In some aspects, 906 may be performed by component 198. For example, again with reference to FIGS. 5-7, the UE 502 may be configured to transmit the SR, the BSR, and/or the PUSCH data (e.g., UL data 514) during the portion of the MG in the MG interval, e.g., a canceled portion, or outside of the MG (620, 630, 640, 650, 660, 670 in FIG. 6; 710, 720, 730, 740 in FIG. 7). In aspects, the SR, the BSR, and/or the PUSCH data (e.g., UL data 514) may be transmitted to the BS 504. The UE 502 may be configured to transmit the SR, the BSR, and/or the PUSCH data (e.g., UL data 514) based on the packet buffer time (e.g., 608 in FIG. 6) being less than or greater than or equal to the delay threshold (604 in FIG. 6), based on DCI, and/or the like, in various aspects. In one aspect, to transmit the SR, the BSR, and/or the PUSCH data (UL data 514), the UE 502 may be configured to transmit the UL data 514 during the MG if the packet buffer time (e.g., 608 in FIG. 6) is less than the delay threshold (e.g., 604 in FIG. 6). In one aspect, to transmit the SR, the BSR, and/or the PUSCH data (UL data 514), the UE 502 may be configured to transmit the UL data 514 outside of the MG if the packet buffer time (e.g., 608 in FIG. 6) is greater than or equal to the delay threshold (e.g., 604 in FIG. 6).

In one aspect, a BSR (e.g., as UL data 514) may be included in a PUSCH, and the UE 502 may be configured to transmit the BSR during the portion of the MG in the MG interval based at least in part on a priority of the BSR (e.g., 720 in FIG. 7). In one aspect, a BSR (e.g., as UL data 514) may be a periodic BSR and may be carried by a PUSCH, where the UE 502 may be configured to transmit the BSR during the portion of the MG in the MG interval based at least in part on a priority of the BSR and remaining PDBs of each BSR in each logical channel group (LCG) associated with the UE 502 (e.g., 720 in FIG. 7). In one aspect, the UE 502 may be configured to transmit a SR (e.g., as UL data 514 in FIG. 5; 732 in FIG. 7) during the portion of the MG in the MG interval based at least in part on a transition time (TR) for radio frequency (RF) tuning associated with the MG, a start of the MG, and/or an end of the MG (e.g., 730 in FIG. 7). In the aspects, the UE 502 may be configured to transmit the SR (e.g., 430, 732 in FIG. 7) outside of the TR and within the MG.

In one aspect (e.g., 740 in FIG. 7), PUSCH data (e.g., as UL data 514 in FIG. 5; 742 in FIG. 7) may follow a prior SR (e.g., 746 in FIG. 7) that may indicate a priority or a remainder of a PDB and that may include an UL dynamic grant (DG) or an activation of a configured grant (CG) (e.g., 744, 748 in FIG. 7). In the aspect, the UE 502 may be configured to transmit the PUSCH data based on the prior SR (e.g., 746 in FIG. 7) that indicates the priority and/or the remainder of the PDB. In the aspect, the UE 502 may be configured to transmit the PUSCH data outside of a TR for RF tuning associated with the MG and within the MG.

Finally, at 916, the UE receives, from the network node and subsequent to the configuration of the delay threshold, an updated configuration of the delay threshold via at least one of subsequent RRC signaling, a subsequent MAC-CE, or subsequent DCI. In some aspects, 906 may be performed by component 198. For example, again with reference to FIGS. 5-7, subsequent to transmitting the SR, the BSR, and/or the PUSCH data (e.g., UL data 514), the UE 502 may receive an updated configuration 516 of the delay threshold (e.g., 604 in FIG. 6) via at least one of subsequent RRC signaling, a subsequent MAC-CE, or subsequent DCI. The updated configuration 516 may include additional configuration for a new amount of MG to cancel, shorten, split, shift, etc., may be configured by the BS 504 as similarly described at 506 above for the configuration 508 in FIG. 5, and the updated configuration may be based at least on updated UE delay parameters, mobility, positioning, and/or the like, for the UE 502, and/or on network load, network delay parameters, and/or the like, determined or obtained by the BS 504.

Figure 10:
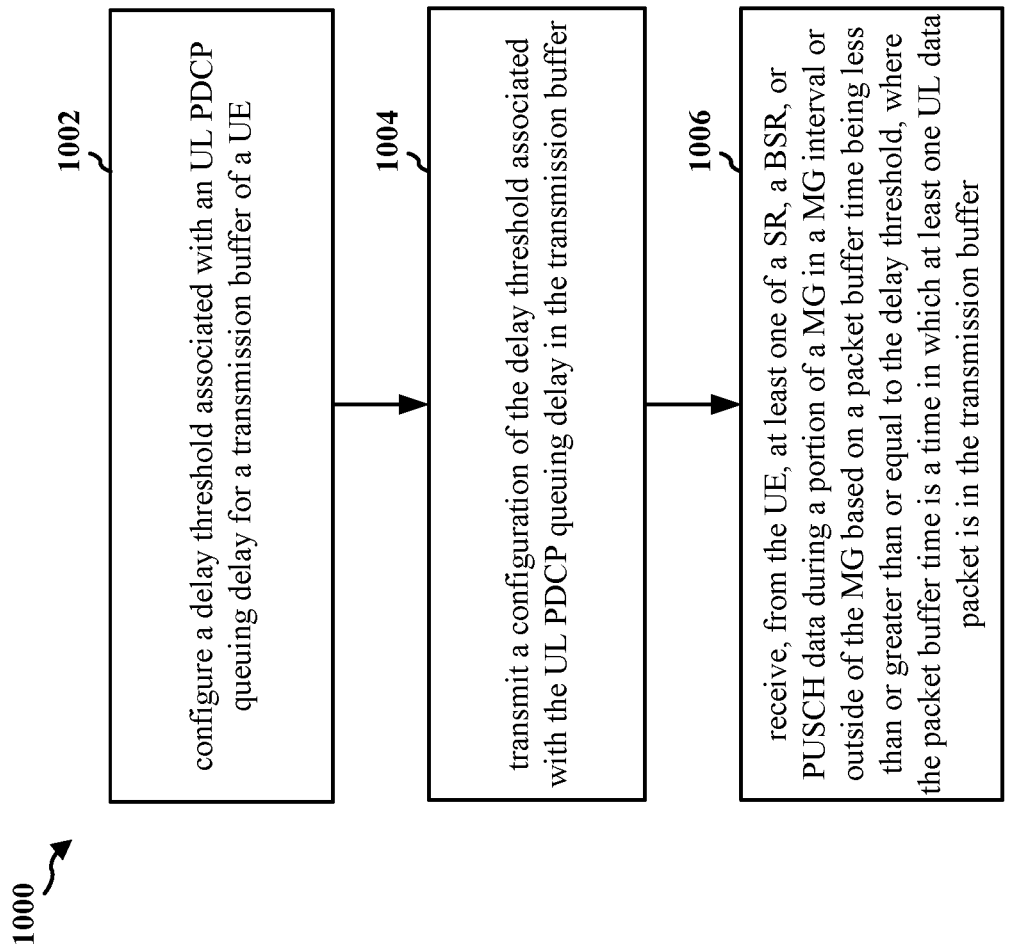
FIG. 10 is a flowchart of a method of wireless communication, in accordance with various aspects of the present disclosure.

FIG. 10 is a flowchart 1000 of a method of wireless communication, in various aspects. The method may be performed by a base station (e.g., the base station 102; the BS 410; the BS 504; the network entity 1202. At 1002, the network entity configures a delay threshold associated with an uplink (UL) packet data convergence protocol (PDCP) queuing delay for a transmission buffer of a user equipment (UE). In some aspects, 1002 may be performed by component 199. For example, the network node (e.g., BS 504 in FIG. 5) may configure (e.g., at 506) the delay threshold (e.g., 604 in FIG. 6) associated with an UL PDCP queuing delay (e.g., 608 in FIG. 6) for a transmission buffer (602 in FIG. 6) of the UE 502. In aspects, the BS 504 thus generates or specifies a configuration 508. In aspects, the configuration 508 may be of a delay threshold (e.g., 604 in FIG. 6) associated with UL PDCP queuing delay (e.g., 608 in FIG. 6) for the transmission buffer (e.g., 602 in FIG. 6) of the UE 502.

At 1004, the network entity transmits a configuration of the delay threshold associated with the UL PDCP queuing delay in the transmission buffer. In some aspects, 1004 may be performed by component 199. For example, referencing again FIGS. 5-7, the configuration 508 may be transmitted for the UE 502 (e.g., via RRC, MAC-CE, DCI, etc.) from the BS 504. In aspects, the delay threshold (e.g., 604 in FIG. 6) associated with the UL PDCP queuing delay (e.g., 608 in FIG. 6) for the transmission buffer (e.g., 602) may be further associated with a remaining PDB, a PDB, and/or quality of service (QoS) flow attributes (e.g., 609 in FIG. 6). In aspects, the configuration 508 may include a second configuration, transmitted to the UE 502 from the BS 504, for an amount of MG to shorten or cancel, as described below, while in other aspects, the second configuration may be separately transmitted for the UE 502 by the BS 504.

Finally, at 1006, the network entity receives, from the UE, at least one of a SR, a BSR, or PUSCH data during a portion of a MG in a MG interval or outside of the MG based on a packet buffer time being less than or greater than or equal to the delay threshold, where the packet buffer time is a time in which at least one UL data packet is in the transmission buffer. In some aspects, 1006 may be performed by component 199. For example, referencing again FIGS. 5-7, the BS 504 receives, from the UE 502, the SR, the BSR, and/or the PUSCH data (e.g., UL data 514) during the portion of the MG in the MG interval, e.g., a canceled portion, or outside of the MG (e.g., 620, 630, 640, 650, 660, 670 in FIG. 6; 710, 720, 730, 740 in FIG. 7). The BS 504 may be configured to receive the SR, the BSR, and/or the PUSCH data (UL data 514) based on the packet buffer time (e.g., 608 in FIG. 6) being less than or greater than or equal to the delay threshold (e.g., 604 in FIG. 6), based on DCI, and/or the like, in various aspects. In one aspect, to receive the SR, the BSR, and/or the PUSCH data (e.g., UL data 514), the BS 504 may be configured to receive the UL data 514 during the MG if the packet buffer time (e.g., 608 in FIG. 6) is less than the delay threshold (e.g., 604 in FIG. 6). In one aspect, to receive the SR, the BSR, and/or the PUSCH data (UL data 514), the BS 504 may be configured to transmit the UL data 514 outside of the MG if the packet buffer time (e.g., 608 in FIG. 6) is greater than or equal to the delay threshold (e.g., 604 in FIG. 6).

Figure 11:
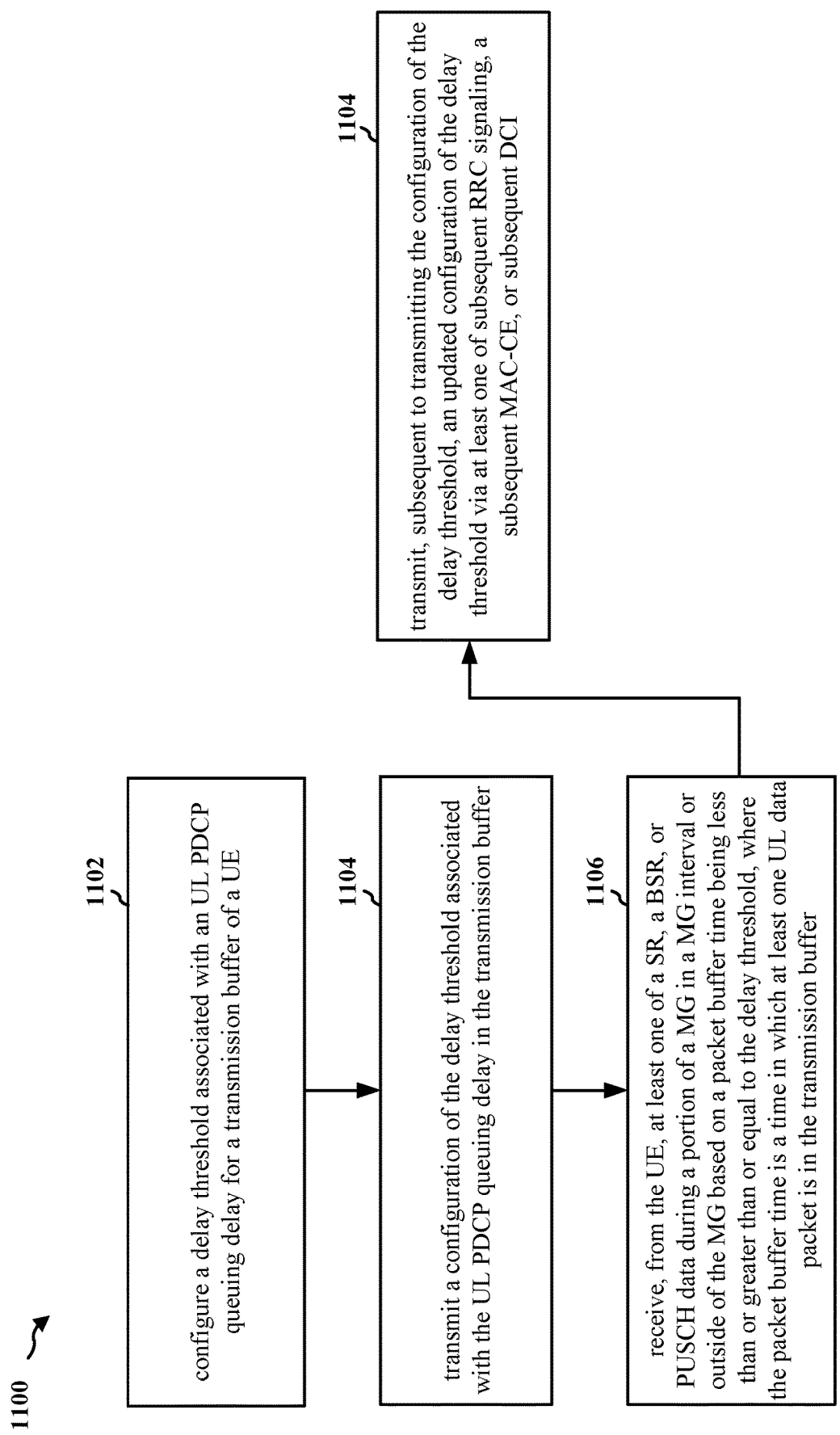
FIG. 11 is a flowchart of a method of wireless communication, in accordance with various aspects of the present disclosure.

FIG. 11 is a flowchart 1100 of a method of wireless communication, in various aspects. The method may be performed by a base station (e.g., the base station 102; the BS 410; the BS 504; the network entity 1202. At 1102, the network entity configures a delay threshold associated with an uplink (UL) packet data convergence protocol (PDCP) queuing delay for a transmission buffer of a user equipment (UE). In some aspects, 1102 may be performed by component 199. For example, the network node (e.g., BS 504 in FIG. 5) may configure (e.g., at 506) the delay threshold (e.g., 604 in FIG. 6) associated with an UL PDCP queuing delay (e.g., 608 in FIG. 6) for a transmission buffer (e.g., 602 in FIG. 6) of the UE 502. In aspects, the BS 504 thus generates or specifies a configuration 508. In aspects, the configuration 508 may be of a delay threshold (e.g., 604 in FIG. 6) associated with UL PDCP queuing delay (e.g., 608 in FIG. 6) for the transmission buffer (e.g., 602 in FIG. 6) of the UE 502.

At 1104, the network entity transmits a configuration of the delay threshold associated with the UL PDCP queuing delay in the transmission buffer. In some aspects, 1104 may be performed by component 199. For example, referencing again FIGS. 5-7, the configuration 508 may be transmitted for the UE 502 (e.g., via RRC, MAC-CE, DCI, etc.) from the BS 504. In aspects, the delay threshold (e.g., 604 in FIG. 6) associated with the UL PDCP queuing delay (e.g., 608 in FIG. 6) for the transmission buffer (e.g., 602) may be further associated with a remaining PDB, a PDB, and/or quality of service (QoS) flow attributes (e.g., 609 in FIG. 6). In aspects, the configuration 508 may include a second configuration, transmitted to the UE 502 from the BS 504, for an amount of MG to shorten or cancel, as described below, while in other aspects, the second configuration may be separately transmitted for the UE 502 by the BS 504.

At 1106, the network entity receives, from the UE, at least one of a SR, a BSR, or PUSCH data during a portion of a MG in a MG interval or outside of the MG based on a packet buffer time being less than or greater than or equal to the delay threshold, where the packet buffer time is a time in which at least one UL data packet is in the transmission buffer. In some aspects, 1106 may be performed by component 199. For example, referencing again FIGS. 5-7, the BS 504 receives, from the UE 502, the SR, the BSR, and/or the PUSCH data (e.g., UL data 514) during the portion of the MG in the MG interval, e.g., a canceled portion, or outside of the MG (e.g., 620, 630, 640, 650, 660, 670 in FIG. 6; 710, 720, 730, 740 in FIG. 7). The BS 504 may be configured to receive the SR, the BSR, and/or the PUSCH data (e.g., UL data 514) based on the packet buffer time (e.g., 608 in FIG. 6) being less than or greater than or equal to the delay threshold (e.g., 604 in FIG. 6), based on DCI, and/or the like, in various aspects. In one aspect, to receive the SR, the BSR, and/or the PUSCH data (e.g., UL data 514), the BS 504 may be configured to receive the UL data 514 during the MG if the packet buffer time (e.g., 608 in FIG. 6) is less than the delay threshold (e.g., 604 in FIG. 6). In one aspect, to receive the SR, the BSR, and/or the PUSCH data (e.g., UL data 514), the BS 504 may be configured to transmit the UL data 514 outside of the MG if the packet buffer time (e.g., 608 in FIG. 6) is greater than or equal to the delay threshold (e.g., 604 in FIG. 6).

Finally, at 1108, the network entity transmits, subsequent to transmitting the configuration of the delay threshold, an updated configuration of the delay threshold via at least one of subsequent RRC signaling, a subsequent MAC-CE, or subsequent DCI. In some aspects, 1108 may be performed by component 199. For example, referencing again FIGS. 5-7, subsequent to transmitting the configuration (e.g., 508 in FIG. 5), the BS 504 may transmit an updated configuration (516) of the delay threshold (e.g., 604 in FIG. 6) via at least one of subsequent RRC signaling, a subsequent MAC-CE, or subsequent DCI. The updated configuration (e.g., 516) may include additional configuration for a new amount of MG to cancel, shorten, split, shift, etc., may be configured by the BS 504 as similarly described at 506 above for the configuration 508 in FIG. 5 (also as described for 1002 in FIG. 10; 1102 in FIG. 11), and the updated configuration may be based at least on updated UE delay parameters, mobility, positioning, and/or the like, for the UE 502, and/or on network load, network delay parameters, and/or the like, determined or obtained by the BS 504.

Figure 12:
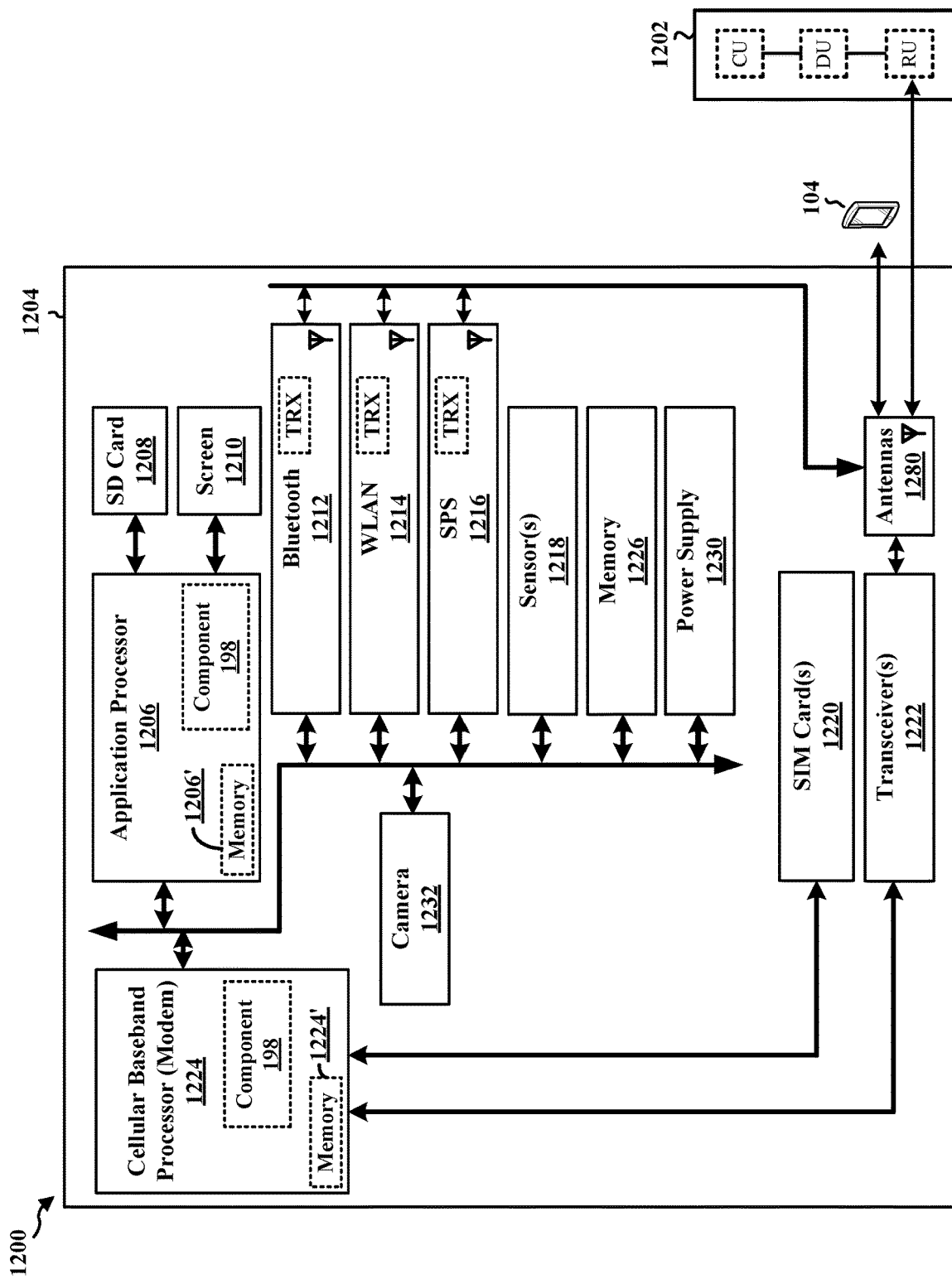
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

As discussed supra, the component 198 is configured to obtain a configuration of a delay threshold associated with an uplink (UL) packet data convergence protocol (PDCP) queuing delay for a transmission buffer. The component 198 is configured to measure a packet buffer time in which at least one UL data packet is in the transmission buffer, where the at least one UL data packet is associated with a scheduling request (SR), a buffer status report (BSR), or physical uplink shared channel (PUSCH) data. In addition, the component 198 is configured to transmit, for a network node, at least one of the SR, the BSR, or the PUSCH data during a portion of a measurement gap (MG) in a MG interval or outside of the MG based on the packet buffer time being less than or greater than or equal to the delay threshold. The component 198 may be configured to cancel at least the portion of the MG in the MG interval if the packet buffer time is greater than or equal to the delay threshold. The component 198 may be configured to compare the packet buffer time to the delay threshold to generate a delay comparison, where the component 198 may be configured to transmit at least one of the SR, the BSR, or the PUSCH data during the MG or outside of the MG based on the delay comparison. The component 198, to obtain the configuration of the delay threshold, may be configured to receive, from the network node, the configuration of the delay threshold via at least one of radio resource control (RRC) signaling, a medium access control (MAC) control element (MAC-CE), or downlink control information (DCI). The component 198 may be configured to receive, from the network node and subsequent to receiving the configuration of the delay threshold, an updated configuration of the delay threshold via at least one of subsequent RRC signaling, a subsequent MAC-CE, or subsequent DCI. The component 198 may be configured to receive non-scheduling or scheduling downlink control information (DCI) that includes an indication to prioritize at least one of the SR, the BSR or the PUSCH data over the MG, where the component 198, to transmit at least one of the SR, the BSR, or the PUSCH data during the portion of the MG in the MG interval, may be configured to transmit based on the indication to prioritize at least one of the SR, the BSR, or the PUSCH data over the MG. The component 198 may be further configured to perform any of the aspects described in connection with FIGS. 8, 9, 10, 11, and/or performed by the UE in FIGS. 4, 5. The component 198 may be within the cellular baseband processor 1224, the application processor 1206, or both the cellular baseband processor 1224 and the application processor 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for obtaining a configuration of a delay threshold associated with an uplink (UL) packet data convergence protocol (PDCP) queuing delay for a transmission buffer. In the configuration, the apparatus 1204, and in particular the cellular baseband processor 1224 and/or the application processor 1206, includes means for measuring a packet buffer time in which at least one UL data packet is in the transmission buffer, where the at least one UL data packet is associated with a scheduling request (SR), a buffer status report (BSR), or physical uplink shared channel (PUSCH) data. In the configuration, the apparatus 1204, and in particular the cellular baseband processor 1224 and/or the application processor 1206, includes means for transmitting, for a network node, at least one of the SR, the BSR, or the PUSCH data during a portion of a measurement gap (MG) in a MG interval or outside of the MG based on the packet buffer time being less than or greater than or equal to the delay threshold. In one configuration, the apparatus 1204, and in particular the cellular baseband processor 1224 and/or the application processor 1206, may include means for canceling at least the portion of the MG in the MG interval if the packet buffer time is greater than or equal to the delay threshold. In one configuration, the apparatus 1204, and in particular the cellular baseband processor 1224 and/or the application processor 1206, may include means for comparing the packet buffer time to the delay threshold to generate a delay comparison, where at least one of the SR, the BSR, or the PUSCH data is transmitted during the MG or outside of the MG based on the delay comparison. In one configuration, the apparatus 1204, and in particular the cellular baseband processor 1224 and/or the application processor 1206, may include means for obtaining the configuration of the delay threshold by receiving, from the network node, the configuration of the delay threshold via at least one of radio resource control (RRC) signaling, a medium access control (MAC) control element (MAC-CE), or downlink control information (DCI). In one configuration, the apparatus 1204, and in particular the cellular baseband processor 1224 and/or the application processor 1206, may include means for receiving, from the network node and subsequent to receiving the configuration of the delay threshold, an updated configuration of the delay threshold via at least one of subsequent RRC signaling, a subsequent MAC-CE, or subsequent DCI. In one configuration, the apparatus 1204, and in particular the cellular baseband processor 1224 and/or the application processor 1206, may include means for receiving, via at least one transceiver of the UE, non-scheduling or scheduling downlink control information (DCI) that includes an indication to prioritize at least one of the SR, the BSR, or the PUSCH data over the MG, and where transmitting at least one of the SR, the BSR, or the PUSCH data during the portion of the MG in the MG interval is based on the indication to at least one of the SR, the BSR, or the PUSCH data over the MG. The application processor 1206 may further include means for performing any of the aspects described in connection with FIGS. 8, 9, 10, 11, and/or performed by the UE in FIGS. 4, 5. The means may be the component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
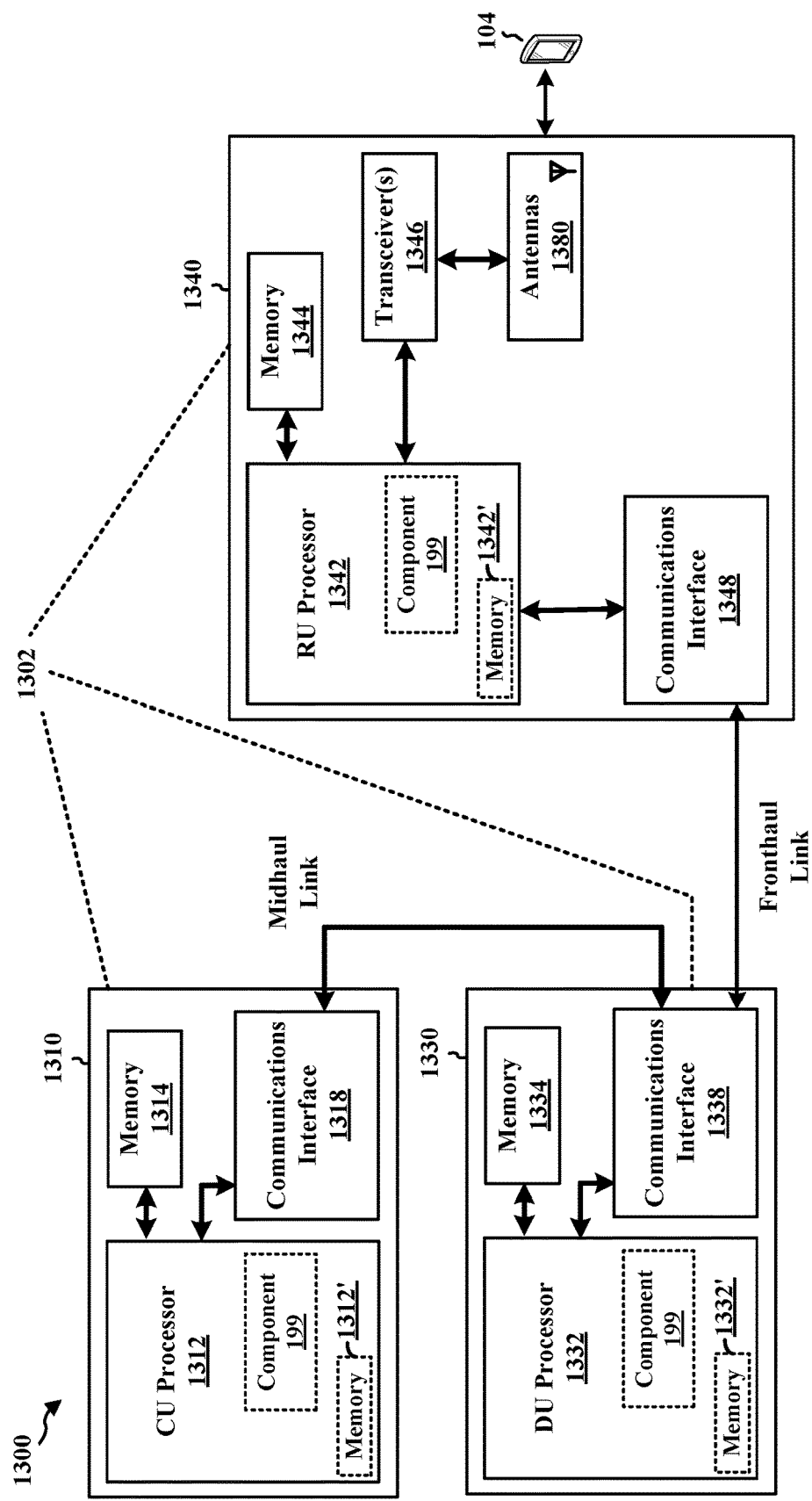
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to configure a delay threshold associated with an uplink (UL) packet data convergence protocol (PDCP) queuing delay for a transmission buffer of a user equipment (UE). The component 199 is also configured to transmit a configuration of the delay threshold associated with the UL PDCP queuing delay in the transmission buffer. The component 199 is further configured to receive, from the UE, at least one of a scheduling request (SR), a buffer status report (BSR), or physical uplink shared channel (PUSCH) data during a portion of a measurement gap (MG) in a MG interval or outside of the MG based on a packet buffer time being less than or greater than or equal to the delay threshold, where the packet buffer time is a time in which at least one UL data packet is in the transmission buffer. The component 199 may be configured to transmit, subsequent to the configuration of the delay threshold, an updated configuration of the delay threshold via at least one of subsequent RRC signaling, a subsequent MAC-CE, or subsequent DCI. The component 199 may be further configured to perform any of the aspects described in connection with FIGS. 8, 9, 10, 11, and/or performed by the network entity (e.g., network node, base station, a component of a base station) in FIGS. 4, 5. The component 199 may be within one or more processors of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 includes means for configuring a delay threshold associated with an uplink (UL) packet data convergence protocol (PDCP) queuing delay for a transmission buffer of a user equipment (UE). In the configuration, the network entity 1302 also includes means for transmitting a configuration of the delay threshold associated with the UL PDCP queuing delay in the transmission buffer. In the configuration, the network entity 1302 further includes means for receiving, from the UE, at least one of a scheduling request (SR), a buffer status report (BSR), or physical uplink shared channel (PUSCH) data during a portion of a measurement gap (MG) in a MG interval or outside of the MG based on a packet buffer time being less than or greater than or equal to the delay threshold, where the packet buffer time is a time in which at least one UL data packet is in the transmission buffer. In one configuration, the network entity 1302 may include means for transmitting, subsequent to transmitting the configuration of the delay threshold, an updated configuration of the delay threshold via at least one of subsequent RRC signaling, a subsequent MAC-CE, or subsequent DCI. The network entity 1302 may include means for performing any of the aspects described in connection with FIGS. 8, 9, 10, 11, and/or performed by the network entity (e.g., network node, base station, a component of a base station) in FIGS. 4, 5. The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

Wireless communication networks, such as a 5G NR networks, may be designed to include measurement gaps (MGs) that allow user equipment (UE) to prevent radio link failures in mobility scenarios. However, MGs may prevent the UE from transmitting uplink (UL) data based on the MGs having a higher priority, and increasing the latency for such UL traffic may risk decreasing reliability and UL capacity. For instance, MGs prioritized over UL traffic for a UE may cause transmission of UL data on next available UL resources to be delayed due to the MG interval, which in turn may result in the packet delay budget (PDB) of the uplink UL data being exceeding and causing the UL data to become obsolete/discarded. For instance, some configurations may prohibit SRs from being transmitted by a UE when the next SR opportunity falls in a MG interval (e.g., similar to prohibitions for SR-Prohibit timers, a DL PDCCH with UL resources being received, etc.). When UL traffic arrives at the UE transmission buffer, an SR may be triggered if certain triggering conditions are satisfied. If the UL data packet has been queued/waiting in the UE's transmission buffer for a long time, it may be useful for the UE to quickly send an SR (e.g., and utilize the next available SR opportunity) requesting a network node (e.g., a BS and/or the like) to grant UL resources to the UE for transmission of the UL data packet. However, if the next available UL SR resource falls in the MG interval, the UE may not be allowed to transmit the SR, causing the latency to increase as the UE has to wait for the next SR opportunity based on SR periodicity. Thus, the UL PDB may be exceeded which decreases reliability and UL capacity.

While MG may be important and/or prioritized for a UE over other procedures for mobility scenarios (e.g., to prevent radio link failure), aspects herein provide for balancing MG and UL traffic priorities to prevent decreases in latency, reliability, and UL capacity for delay-impacted UL traffic. That is, aspects provide for prioritization between SR/BSR/PUSCH data transmissions and MG if certain conditions are satisfied. For example, a UE may obtain a configuration of a delay threshold associated with an UL PDCP queuing delay for a transmission buffer, measure a packet buffer time in which a UL data packet(s) is in the transmission buffer (e.g., SR/BSR/PUSCH data), and transmit the UL data packet(s) during a portion of a MG in a MG interval or outside of the MG based on the packet buffer time being less than or greater than or equal to the delay threshold.

Accordingly, aspects described herein for resolving SR, BSR, and/or PUSCH data delay from MG conflict for low latency provide enhancements to latency handling for UL traffic in a wireless network, such as a 5G NR network among other example networks, in which MGs are utilized.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: obtaining a configuration of a delay threshold associated with an uplink (UL) packet data convergence protocol (PDCP) queuing delay for a transmission buffer, measuring a packet buffer time in which at least one UL data packet is in the transmission buffer, where the at least one UL data packet is associated with a scheduling request (SR), a buffer status report (BSR), or physical uplink shared channel (PUSCH) data, and transmitting, for a network node, at least one of the SR, the BSR, or the PUSCH data during a portion of a measurement gap (MG) in a MG interval or outside of the MG based on the packet buffer time being less than or greater than or equal to the delay threshold.

Aspect 2 is the method of aspect 1, where transmitting at least one of the SR, the BSR, or the PUSCH data includes transmitting at least one of the SR, the BSR, or the PUSCH data during the MG if the packet buffer time is less than the delay threshold, and where transmitting at least one of the SR, the BSR, or the PUSCH data includes transmitting at least one of the SR, the BSR, or the PUSCH data outside of the MG if the packet buffer time is greater than or equal to the delay threshold.

Aspect 3 is the method of any of aspects 1 and 2, further including: canceling at least the portion of the MG in the MG interval if the packet buffer time is greater than or equal to the delay threshold.

Aspect 4 is the method of aspect 3, where canceling at least the portion of the MG in the MG interval includes shortening the MG to exclude at least the portion of the MG in the MG interval.

Aspect 5 is the method of aspect 4, where shortening the MG to exclude at least the portion of the MG in the MG interval is based on an amount of the MG to be shortened, and where the amount of the MG to be shortened is based on a second configuration from the network node.

Aspect 6 is the method of any of aspects 3 to 5, where the packet buffer time is associated with a timer over the MG for an arrival of a data packet, and where canceling at least the portion of the MG in the MG interval is based on the UL PDCP queuing delay and the timer.

Aspect 7 is the method of any of aspects 1 to 6, further including: comparing the packet buffer time to the delay threshold to generate a delay comparison, where at least one of the SR, the BSR, or the PUSCH data is transmitted during the MG or outside of the MG based on the delay comparison.

Aspect 8 is the method of any of aspects 1 to 7, where the at least one UL data packet is at least one UL packet data unit (PDU).

Aspect 9 is the method of any of aspects 1 to 9, where obtaining the configuration of the delay threshold includes: receiving, from the network node, the configuration of the delay threshold via at least one of radio resource control (RRC) signaling, a medium access control (MAC) control element (MAC-CE), or downlink control information (DCI).

Aspect 10 is the method of aspect 9, further including: receiving, from the network node and subsequent to receiving the configuration of the delay threshold, an updated configuration of the delay threshold via at least one of subsequent RRC signaling, a subsequent MAC-CE, or subsequent DCI.

Aspect 11 is the method of aspect 9, where the delay threshold associated with the UL PDCP queuing delay for the transmission buffer is further associated with at least one of a remaining packet delay budget (PDB), a PDB, or quality of service (QoS) flow attributes.

Aspect 12 is the method of any of aspects 1 to 11, where the BSR is included in a PUSCH, and where transmitting the BSR during the portion of the MG in the MG interval is based at least in part on a priority of the BSR.

Aspect 13 is the method of any of aspects 1 to 12, where the BSR is a periodic BSR and is carried by a PUSCH, and where transmitting the BSR during the portion of the MG in the MG interval is based at least in part on a priority of the BSR and remaining packet delay budgets (PDBs) of each BSR in each logical channel group (LCG) associated with the UE.

Aspect 14 is the method of any of aspects 1 to 12, where the BSR is an aperiodic BSR associated with a prior SR, and where transmitting the BSR during the portion of the MG in the MG interval is based at least in part on an SR priority of the prior SR and remaining packet delay budgets (PDBs) of each data packet associated with each logical channel group (LCG) associated with the UE.

Aspect 15 is the method of any of aspects 1 to 11, where transmitting the SR during the portion of the MG in the MG interval is based at least in part on a transition time (TR) for radio frequency (RF) tuning associated with the MG, a start of the MG, or an end of the MG.

Aspect 16 is the method of aspect 15, where transmitting the SR includes transmitting the SR outside of the TR and within the MG.

Aspect 17 is the method of any of aspects 1 to 11, where the PUSCH data follows a prior SR that indicates a priority or a remainder of a packet delay budget (PDB) and that includes an UL dynamic grant (DG) or an activation of a configured grant (CG), and where transmitting the PUSCH data is based on the prior SR that indicates the priority or the remainder of the PDB.

Aspect 18 is the method of aspect 17, where transmitting the PUSCH data includes transmitting the PUSCH data outside of a transition time (TR) for radio frequency (RF) tuning associated with the MG and within the MG.

Aspect 19 is the method of any of aspects 1 to 18, further including: receiving, via at least one transceiver of the UE, non-scheduling or scheduling downlink control information (DCI) that includes an indication to prioritize at least one of the SR, the BSR, or the PUSCH data over the MG, and where transmitting at least one of the SR, the BSR, or the PUSCH data during the portion of the MG in the MG interval is based on the indication to at least one of the SR, the BSR, or the PUSCH data over the MG.

Aspect 20 is a method of wireless communication at a network node, including: configuring a delay threshold associated with an uplink (UL) packet data convergence protocol (PDCP) queuing delay for a transmission buffer of a user equipment (UE), transmitting a configuration of the delay threshold associated with the UL PDCP queuing delay in the transmission buffer, and receiving, from the UE, at least one of a scheduling request (SR), a buffer status report (BSR), or physical uplink shared channel (PUSCH) data during a portion of a measurement gap (MG) in a MG interval or outside of the MG based on a packet buffer time being less than or greater than or equal to the delay threshold, where the packet buffer time is a time in which at least one UL data packet is in the transmission buffer.

Aspect 21 is the method of aspect 20, where receiving at least one of the SR, the BSR, or the PUSCH data includes receiving at least one of the SR, the BSR, or the PUSCH data during the MG if the packet buffer time is less than the delay threshold, and where receiving at least one of the SR, the BSR, or the PUSCH data includes receiving at least one of the SR, the BSR, or the PUSCH data outside of the MG if the packet buffer time is greater than or equal to the delay threshold.

Aspect 22 is the method of aspects 20 and 21, where the at least one UL data packet is at least one UL packet data unit (PDU).

Aspect 23 is the method of any of aspects 20 to 22, where transmitting the configuration of the delay threshold includes transmitting the configuration of the delay threshold via at least one of radio resource control (RRC) signaling, a medium access control (MAC) control element (MAC-CE), or downlink control information (DCI).

Aspect 24 is the method of aspect 23, further including: transmitting, via at least one transceiver of the network node and subsequent to transmitting the configuration of the delay threshold, an updated configuration of the delay threshold via at least one of subsequent RRC signaling, a subsequent MAC-CE, or subsequent DCI.

Aspect 25 is the method of any of aspects 20 to 24, where the delay threshold associated with the UL PDCP queuing delay for the transmission buffer is further associated with at least one of a remaining packet delay budget (PDB), a PDB, or quality of service (QoS) flow attributes.

Aspect 26 is the method of any of aspects 20 to 25, where the BSR is included in a PUSCH, and where receiving the BSR during the portion of the MG in the MG interval is based at least in part on a priority of the BSR.

Aspect 27 is the method of any of aspects 20 to 25, where receiving the SR during the portion of the MG in the MG interval is based at least in part on a transition time (TR) for radio frequency (RF) tuning associated with the MG, a start of the MG, or an end of the MG, and where receiving the SR during the portion of the MG in the MG interval includes receiving the SR outside of the TR and within the MG.

Aspect 28 is the method of any of aspects 20 to 25, where the PUSCH data follows a prior SR that indicates a priority or a remainder of a packet delay budget (PDB) and that includes an UL dynamic grant (DG) or an activation of a configured grant (CG), where receiving the PUSCH data is based on the prior SR that indicates the priority or the remainder of the PDB, and where receiving the PUSCH data includes receiving the PUSCH data outside of transition time (TR) for radio frequency (RF) tuning associated with the MG and within the MG.

Aspect 29 is an apparatus for wireless communication configured to implement any of aspects 1 to 28.

Aspect 30 is an apparatus for wireless communication including means for implementing any of aspects 1 to 28.

Aspect 31 is a computer-readable medium (e.g., a non-transitory computer-readable medium) storing computer executable code, the code when executed by at least one processor causes the at least one processor to implement any of aspects 1 to 28.

What is claimed is:

1. An apparatus for wireless communication at a user equipment (UE), comprising:
    a memory; and
    at least one processor coupled to the memory and, based at least in part on information stored in the memory, the at least one processor is configured to:
        obtain a configuration of a delay threshold associated with an uplink (UL) packet data convergence protocol (PDCP) queuing delay for a transmission buffer;
        measure a packet buffer time in which at least one UL data packet is in the transmission buffer, wherein the at least one UL data packet is associated with a scheduling request (SR), a buffer status report (BSR), or physical uplink shared channel (PUSCH) data; and
        transmit, for a network node, at least one of the SR, the BSR, or the PUSCH data during a portion of a measurement gap (MG) in a MG interval or outside of the MG based on the packet buffer time being less than or greater than or equal to the delay threshold.

2. The apparatus of claim 1, wherein to transmit at least one of the SR, the BSR, or the PUSCH data, the at least one processor is configured to transmit at least one of the SR, the BSR, or the PUSCH data during the MG if the packet buffer time is less than the delay threshold, and wherein to transmit at least one of the SR, the BSR, or the PUSCH data, the at least one processor is configured to transmit at least one of the SR, the BSR, or the PUSCH data outside of the MG if the packet buffer time is greater than or equal to the delay threshold.

3. The apparatus of claim 1, wherein the at least one processor is further configured to:
cancel at least the portion of the MG in the MG interval if the packet buffer time is greater than or equal to the delay threshold.

4. The apparatus of claim 3, wherein to cancel at least the portion of the MG in the MG interval, the at least one processor is configured to shorten the MG to exclude at least the portion of the MG in the MG interval.

5. The apparatus of claim 4, wherein to shorten the MG to exclude at least the portion of the MG in the MG interval, the at least one processor is configured to shorten the MG based on an amount of the MG to be shortened, and wherein the amount of the MG to be shortened is based on a second configuration from the network node.

6. The apparatus of claim 3, wherein the packet buffer time is associated with a timer over the MG for an arrival of a data packet, and wherein to cancel at least the portion of the MG in the MG interval, the at least one processor is configured to cancel at least the portion of the MG in the MG interval based on the UL PDCP queuing delay and the timer.

7. The apparatus of claim 1, wherein the at least one processor is further configured to:
compare the packet buffer time to the delay threshold to generate a delay comparison,
wherein to transmit at least one of the SR, the BSR, or the PUSCH data during the portion of the MG or outside of the MG, the at least one processor is configured to transmit at least one of the SR, the BSR, or the PUSCH data during the portion of the MG or outside of the MG based on the delay comparison.

8. The apparatus of claim 1, wherein the at least one UL data packet is at least one UL packet data unit (PDU).

9. The apparatus of claim 1, wherein to obtain the configuration of the delay threshold, the at least one processor is configured to:
receive, from the network node, the configuration of the delay threshold via at least one of radio resource control (RRC) signaling, a medium access control (MAC) control element (MAC-CE), or downlink control information (DCI).

10. The apparatus of claim 9, wherein the at least one processor is further configured to:
receive, from the network node and subsequent to receiving the configuration of the delay threshold, an updated configuration of the delay threshold via at least one of subsequent RRC signaling, a subsequent MAC-CE, or subsequent DCI.

11. The apparatus of claim 9, wherein the delay threshold associated with the UL PDCP queuing delay for the transmission buffer is further associated with at least one of a remaining packet delay budget (PDB), a PDB, or quality of service (QoS) flow attributes.

12. The apparatus of claim 1, wherein the BSR is included in a PUSCH, and wherein to transmit the BSR during the portion of the MG in the MG interval, the at least one processor is configured to transmit the BSR during the portion of the MG in the MG interval based at least in part on a priority of the BSR.

13. The apparatus of claim 1, wherein the BSR is a periodic BSR and is carried by a PUSCH, and wherein to transmit the BSR during the portion of the MG in the MG interval, the at least one processor is configured to transmit the BSR during the portion of the MG in the MG interval based at least in part on a priority of the BSR and remaining packet delay budgets (PDBs) of each BSR in each logical channel group (LCG) associated with the UE.

14. The apparatus of claim 1, wherein the BSR is an aperiodic BSR associated with a prior SR, and wherein to transmit the BSR during the portion of the MG in the MG interval, the at least one processor is configured to transmit the BSR during the portion of the MG in the MG interval based at least in part on an SR priority of the prior SR and remaining packet delay budgets (PDBs) of each data packet associated with each logical channel group (LCG) associated with the UE.

15. The apparatus of claim 1, wherein to transmit the SR during the portion of the MG in the MG interval, the at least one processor is configured to transmit the SR during the portion of the MG in the MG interval based at least in part on a transition time (TR) for radio frequency (RF) tuning associated with the MG, a start of the MG, or an end of the MG.

16. The apparatus of claim 15, wherein to transmit the SR, the at least one processor is configured to transmit the SR outside of the TR and within the MG.

17. The apparatus of claim 1, wherein the PUSCH data follows a prior SR that indicates a priority or a remainder of a packet delay budget (PDB) and that includes an UL dynamic grant (DG) or an activation of a configured grant (CG), and wherein to transmit the PUSCH data, the at least one processor is configured to transmit the PUSCH data based on the prior SR that indicates the priority or the remainder of the PDB.

18. The apparatus of claim 17, further comprising at least one transceiver coupled to the at least one processor, wherein to transmit the PUSCH data, the at least one processor is configured to transmit, via the at least one transceiver, the PUSCH data outside of a transition time (TR) for radio frequency (RF) tuning associated with the MG and within the MG.

19. The apparatus of claim 1, wherein the at least one processor is further configured to:
receive non-scheduling or scheduling downlink control information (DCI) that includes an indication to prioritize at least one of the SR, the BSR or the PUSCH data over the MG;
wherein to transmit at least one of the SR, the BSR, or the PUSCH data during the portion of the MG in the MG interval, the at least one processor is configured to transmit at least one of the SR, the BSR, or the PUSCH data during the portion of the MG based on the indication to prioritize at least one of the SR, the BSR, or the PUSCH data over the MG.

20. An apparatus of wireless communications at a network node, comprising:
a memory; and
at least one processor coupled to the memory and, based at least in part on information stored in the memory, the at least one processor is configured to:
configure a delay threshold associated with an uplink (UL) packet data convergence protocol (PDCP) queuing delay for a transmission buffer of a user equipment (UE);

transmit a configuration of the delay threshold associated with the UL PDCP queuing delay in the transmission buffer; and receive, from the UE, at least one of a scheduling request (SR), a buffer status report (BSR), or physical uplink shared channel (PUSCH) data during a portion of a measurement gap (MG) in a MG interval or outside of the MG based on a packet buffer time being less than or greater than or equal to the delay threshold, wherein the packet buffer time is a time in which at least one UL data packet is in the transmission buffer.

21. The apparatus of claim 20, wherein to receive at least one of the SR, the BSR, or the PUSCH data, the at least one processor is configured to receive at least one of the SR, the BSR, or the PUSCH data during the MG if the packet buffer time is less than the delay threshold, and wherein to receive at least one of the SR, the BSR, or the PUSCH data, the at least one processor is configured to receive at least one of the SR, the BSR, or the PUSCH data outside of the MG if the packet buffer time is greater than or equal to the delay threshold.

22. The apparatus of claim 20, wherein the at least one UL data packet is at least one UL packet data unit (PDU).

23. The apparatus of claim 20, wherein to transmit the configuration of the delay threshold, the at least one processor is configured to transmit the configuration of the delay threshold via at least one of radio resource control (RRC) signaling, a medium access control (MAC) control element (MAC-CE), or downlink control information (DCI).

24. The apparatus of claim 23, wherein the at least one processor is further configured to:
transmit, subsequent to the configuration of the delay threshold, an updated configuration of the delay threshold via at least one of subsequent RRC signaling, a subsequent MAC-CE, or subsequent DCI.

25. The apparatus of claim 24, wherein the delay threshold associated with the UL PDCP queuing delay for the transmission buffer is further associated with at least one of a remaining packet delay budget (PDB), a PDB, or quality of service (QoS) flow attributes.

26. The apparatus of claim 20, wherein the BSR is included in a PUSCH, and wherein to receive the BSR during the portion of the MG in the MG interval, the at least one processor is configured to receive the BSR during the portion of the MG in the MG interval based at least in part on a priority of the BSR.

27. The apparatus of claim 20, wherein to receive the SR during the portion of the MG in the MG interval, the at least one processor is configured to receive the SR during the portion of the MG in the MG interval based at least in part on a transition time (TR) for radio frequency (RF) tuning associated with the MG, a start of the MG, or an end of the MG, and wherein to receive the SR during the portion of the MG in the MG interval, the at least one processor is configured to receive the SR outside of the TR and within the MG.

28. The apparatus of claim 20, further comprising at least one transceiver coupled to the at least one processor, wherein the PUSCH data follows a prior SR that indicates a priority or a remainder of a packet delay budget (PDB) and that includes an UL dynamic grant (DG) or an activation of a configured grant (CG), wherein to receive the PUSCH data, the at least one processor is configured to receive, via the at least one transceiver, the PUSCH data based on the prior SR that indicates the priority or the remainder of the PDB, and wherein to receive the PUSCH data, the at least one processor is configured to receive the PUSCH data outside of transition time (TR) for radio frequency (RF) tuning associated with the MG and within the MG.

29. A method of wireless communications at a user equipment (UE), comprising:
obtaining a configuration of a delay threshold associated with an uplink (UL) packet data convergence protocol (PDCP) queuing delay for a transmission buffer;
measuring a packet buffer time in which at least one UL data packet is in the transmission buffer, wherein the at least one UL data packet is associated with a scheduling request (SR), a buffer status report (BSR), or physical uplink shared channel (PUSCH) data; and
transmitting, for a network node, at least one of the SR, the BSR, or the PUSCH data during a portion of a measurement gap (MG) in a MG interval or outside of the MG based on the packet buffer time being less than or greater than or equal to the delay threshold.

30. A method of wireless communications at a network node, comprising:
configuring a delay threshold associated with an uplink (UL) packet data convergence protocol (PDCP) queuing delay for a transmission buffer of a user equipment (UE);
transmitting a configuration of the delay threshold associated with the UL PDCP queuing delay in the transmission buffer; and
receiving, from the UE, at least one of a scheduling request (SR), a buffer status report (BSR), or physical uplink shared channel (PUSCH) data during a portion of a measurement gap (MG) in a MG interval or outside of the MG based on a packet buffer time being less than or greater than or equal to the delay threshold, wherein the packet buffer time is a time in which at least one UL data packet is in the transmission buffer.

\* \* \* \* \*